United States Patent
Toyama et al.

(10) Patent No.: US 10,576,460 B2
(45) Date of Patent: Mar. 3, 2020

(54) CLUSTER-SUPPORTING CATALYST AND PROCESS FOR PRODUCING THE SAME

(71) Applicants: TOYOTA JIDOSHA KABUSHIKI KAISHA, Toyota-shi, Aichi-ken (JP); GENESIS RESEARCH INSTITUTE, INC., Nagoya-shi, Aichi-ken (JP)

(72) Inventors: Namiki Toyama, Nagoya (JP); Yoshihiro Takeda, Nagoya (JP); Masahiko Ichihashi, Nagoya (JP); Toshiaki Tanaka, Nagoya (JP); Kazuhiro Egashira, Nagoya (JP); Seitoku Ito, Nagoya (JP)

(73) Assignees: TOYOTA JIDOSHA KABUSHIKI KAISHA, Toyota (JP); GENESIS RESEARCH INSTITUTE, INC., Nagoya-shi (JP)

( * ) Notice: Subject to any disclaimer, the term of this patent is extended or adjusted under 35 U.S.C. 154(b) by 0 days.

(21) Appl. No.: 15/969,965

(22) Filed: May 3, 2018

(65) Prior Publication Data
US 2018/0345253 A1    Dec. 6, 2018

(30) Foreign Application Priority Data
May 9, 2017    (JP) .................. 2017-093292

(51) Int. Cl.
| | | |
|---|---|---|
| B01J 29/06 | (2006.01) | |
| B01J 23/46 | (2006.01) | |
| B01J 37/34 | (2006.01) | |
| B01J 29/86 | (2006.01) | |
| B01J 37/16 | (2006.01) | |

(Continued)

(52) U.S. Cl.
CPC .......... *B01J 23/464* (2013.01); *B01D 53/94* (2013.01); *B01D 53/944* (2013.01); *B01D 53/945* (2013.01); *B01J 23/40* (2013.01); *B01J 23/70* (2013.01); *B01J 29/087* (2013.01); *B01J 29/088* (2013.01); *B01J 29/103* (2013.01); *B01J 29/106* (2013.01); *B01J 29/163* (2013.01); *B01J 29/166* (2013.01); *B01J 29/185* (2013.01); *B01J 29/26* (2013.01); *B01J 29/40* (2013.01); *B01J 29/405* (2013.01); *B01J 29/42* (2013.01); *B01J 29/48* (2013.01); *B01J 29/605* (2013.01); *B01J 29/61* (2013.01); *B01J 29/64* (2013.01); *B01J 29/655* (2013.01); *B01J 29/66* (2013.01); *B01J 29/69* (2013.01); *B01J 29/7057* (2013.01); *B01J 29/7065* (2013.01); *B01J 29/723* (2013.01); *B01J 29/7215* (2013.01); *B01J 29/783* (2013.01); *B01J 29/7815* (2013.01); *B01J 29/86* (2013.01); *B01J 37/0203* (2013.01); *B01J 37/0211* (2013.01); *B01J 37/0213* (2013.01); *B01J 37/0219* (2013.01); *B01J 37/0221* (2013.01); *B01J 37/16* (2013.01); *B01J 37/346* (2013.01); *B01J 37/348* (2013.01); *B01J 37/349* (2013.01); *H01M 4/925* (2013.01); *B01D 2255/1021* (2013.01); *B01D 2255/1023* (2013.01); *B01D 2255/1025* (2013.01); *B01D 2255/20761* (2013.01);

(Continued)

(58) Field of Classification Search
CPC .... B01D 53/94; B01D 53/944; B01D 53/945; B01D 2255/50; B01D 2255/502; B01D 2255/504; B01D 2255/70; B01J 29/86; B01J 29/087; B01J 29/088; B01J 29/103; B01J 29/106; B01J 29/163; B01J 29/166; B01J 29/185; B01J 29/26; B01J 29/405; B01J 29/42; B01J 29/48; B01J 29/605; B01J 29/61; B01J 29/64; B01J 29/655; B01J 29/66; B01J 29/69; B01J 29/7215; B01J 29/723; B01J 29/7815; B01J 29/783; B01J 29/7057; B01J 29/7065; B01J 37/16; B01J 37/0203; B01J 37/0211; B01J 37/0213; B01J 37/0221; B01J 37/0219; B01J 37/348; B01J 37/346
USPC ............... 502/60, 73, 74, 77, 78, 79, 85
See application file for complete search history.

(56) References Cited

U.S. PATENT DOCUMENTS

| | | | | |
|---|---|---|---|---|
| 9,221,038 | B2 * | 12/2015 | Wanninger | ........... B01D 53/944 |
| 2013/0281284 | A1 | 10/2013 | Matsuo et al. | |
| 2017/0341063 | A1 * | 11/2017 | Otto | .................... B01D 53/8628 |

FOREIGN PATENT DOCUMENTS

| | | |
|---|---|---|
| JP | 2002-224573 A | 8/2002 |
| JP | 2006-212464 A | 8/2006 |

(Continued)

OTHER PUBLICATIONS

Choi et al. "Mercaptosilane-Assisted Synthesis of Metal Clusters within Zeolites and Catalytic Consequences of Encapsulation", JACS Articles, 132, Jun. 10, 2010, pp. 9129-9137.*

(Continued)

*Primary Examiner* — Elizabeth D Wood
(74) *Attorney, Agent, or Firm* — Oliff PLC

(57) ABSTRACT

Cluster-supporting catalyst having an improved heat resistivity, and method for producing the same are provided. The cluster-supporting catalyst includes boron-substitute zeolite particles, and catalyst metal clusters supported within the pores of the boron-substitute zeolite particles. The method for producing a cluster-supporting catalyst, includes the following steps: providing a dispersion liquid containing a dispersion medium and boron-substitute zeolite particles dispersed in the dispersion medium; and in the dispersion liquid, forming catalyst metal clusters having a positive charge, and supporting the catalyst metal clusters on the acid (Continued)

sites within the pores of the boron-substitute zeolite particles through an electrostatic interaction.

10 Claims, 20 Drawing Sheets

(51) Int. Cl.
| | |
|---|---|
| *B01J 37/02* | (2006.01) |
| *B01J 23/40* | (2006.01) |
| *B01D 53/94* | (2006.01) |
| *B01J 29/40* | (2006.01) |
| *B01J 23/70* | (2006.01) |
| *H01M 4/92* | (2006.01) |
| *B01J 29/10* | (2006.01) |
| *B01J 29/16* | (2006.01) |
| *B01J 29/08* | (2006.01) |
| *B01J 29/48* | (2006.01) |
| *B01J 29/60* | (2006.01) |
| *B01J 29/18* | (2006.01) |
| *B01J 29/42* | (2006.01) |
| *B01J 29/26* | (2006.01) |
| *B01J 29/64* | (2006.01) |
| *B01J 29/61* | (2006.01) |
| *B01J 29/65* | (2006.01) |
| *B01J 29/69* | (2006.01) |
| *B01J 29/66* | (2006.01) |
| *B01J 29/72* | (2006.01) |
| *B01J 29/78* | (2006.01) |
| *B01J 29/70* | (2006.01) |

(52) U.S. Cl.
CPC .... *B01D 2255/50* (2013.01); *B01D 2255/502* (2013.01); *B01D 2255/504* (2013.01); *B01D 2255/70* (2013.01)

(56) References Cited

FOREIGN PATENT DOCUMENTS

| | | |
|---|---|---|
| JP | 2010-69415 A | 4/2010 |
| JP | 2012-148272 A | 8/2012 |
| WO | 2017/115767 A1 | 7/2017 |

OTHER PUBLICATIONS

Otto et al., "Synthesis of stable monodisperse AuPd, AuPt and PdPt bimetallic clusters encapsulated within LTA-zeolites", Journal of Catalysis, 342, 2016, pp. 125-137.*

* cited by examiner

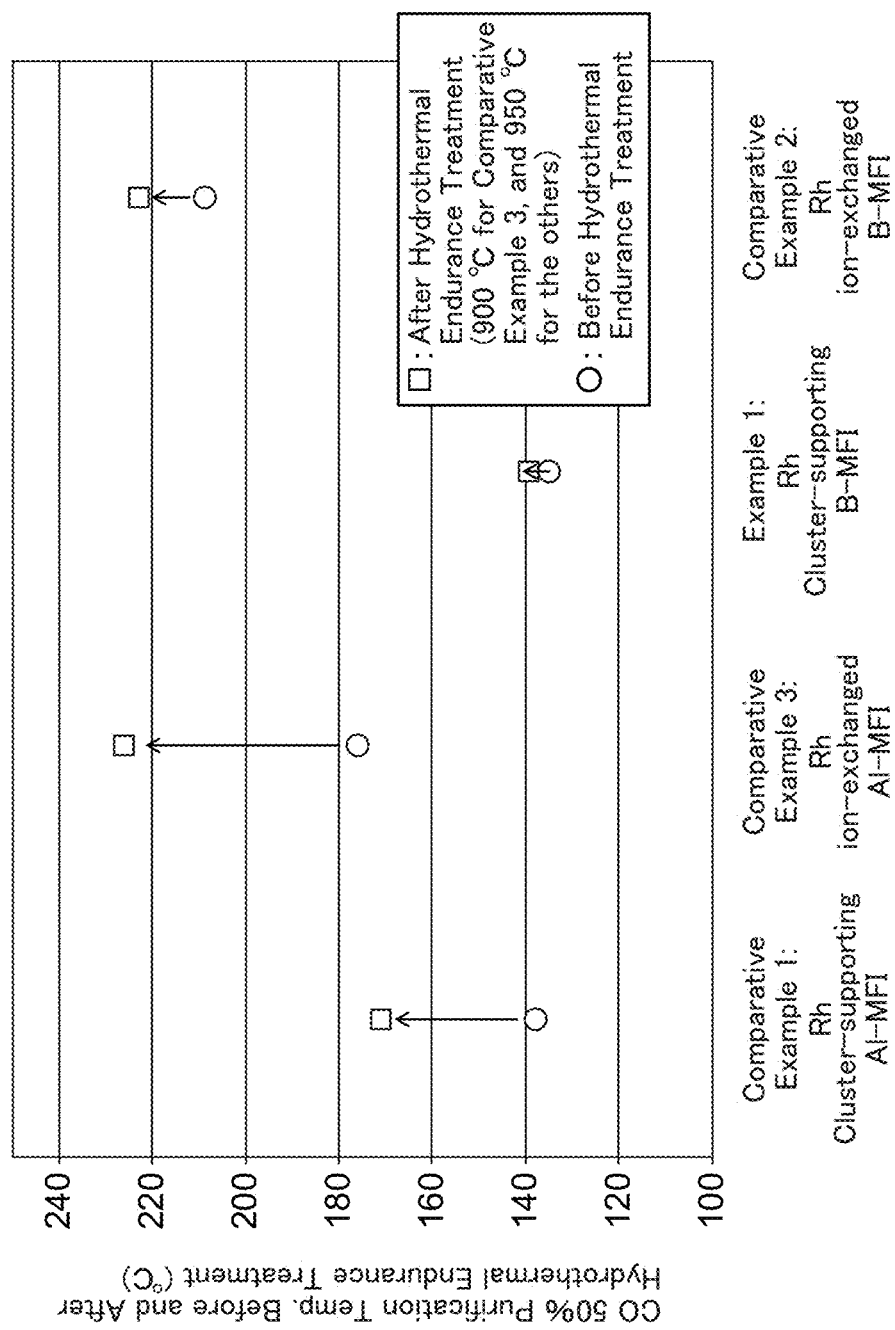

CLUSTER-SUPPORTING CATALYST AND PROCESS FOR PRODUCING THE SAME

TECHNICAL FIELD

The present invention relates to a cluster-supporting catalyst and a production method thereof. More specifically, the present invention relates to a cluster-supporting catalyst for exhaust gas purification, liquid-phase chemical synthesis reaction, gas-phase chemical synthesis reaction, fuel cell reaction, etc., and a production method thereof.

BACKGROUND ART

A supported catalyst obtained by supporting a catalyst metal on a carrier is used in many fields and is used as a catalyst for exhaust gas purification, liquid-phase chemical synthesis reaction, gas-phase chemical synthesis reaction, fuel cell reaction, etc.

As to such a supported catalyst, it is known that the size of the catalyst metal particles supported on a carrier is important. In this connection, for example, Patent Document 1 has proposed a supported catalyst in which catalyst metal particles having a size of 1 to 10 nm are supported on a carrier of alumina, silica, titania, zirconia or a combination thereof. In addition, Patent Document 2 has proposed a catalyst for nitrogen oxide, in which copper ion is supported on zeolite by ion exchange. Furthermore, Patent Document 3 has proposed a technique where palladium supported on zeolite by ion exchange is dried and then clustered by a reduction treatment to prepare a cluster-supporting catalyst, and the cluster-supporting catalyst is used for a coupling reaction, etc.

Incidentally, Patent Document 4 finds that zeolite structure collapses by migration of aluminum atom from the zeolite structure in a high temperature atmosphere containing water vapor such as an exhaust gas atmosphere, and proposes improving heat resistance of zeolite as a catalyst carrier by substituting at least part of aluminum atom in aluminosilicate zeolite with boron atom, calcium atom, indium atom, etc.

Further, in Patent Document 5, which is not disclosed at the filing date of the priority application of the present application, discloses a cluster-supporting catalyst comprising porous carrier particles having acid sites such as zeolite, and catalyst metal clusters supported within the pores of the porous carrier particles; and a method for producing the same.

Incidentally, it is known that boron-substituted zeolite, i.e. zeolite having a structure in which at least part of aluminum atom constituting aluminosilicate zeolite is substituted with boron atom, can be obtain by the method disclosed in Non-Patent Document 1.

RELATED ART

Patent Document

[Patent Document 1] JP2006-212464
[Patent Document 2] JP2012-148272
[Patent Document 3] JP2010-69415
[Patent Document 4] JP2002-224573
[Patent Document 5] PCT/JP2016/088792

Patent Document

[Non-Patent Document 1] Mehdipourghazi M. et al., Microporous and Mesoporous Materials 136 (2010)18-24

SUMMARY OF THE INVENTION

Problems to be Solved by the Invention

Although various supported catalysts have been proposed as described above, a supported catalyst having further improved catalytic activity is demanded. In this connection, the cluster-supporting catalyst described in Patent Document 3 can exhibit reaction properties different from conventional catalysts, but there is room for improvement in regard to the heat resistance. Among others, in the field of exhaust gas purification, a supported catalyst having an improved low-temperature activity for nitrogen oxide (NOx) reduction and/or carbon monoxide (CO) oxidation after thermal endurance is demanded.

Accordingly, the present invention provides a cluster-supporting catalyst having improved heat resistance, and a production method thereof.

Means to Solve the Problems

The present inventors have found that a specific cluster-supporting catalyst has improved heat resistance, and arrived at the present invention described below.

EMBODIMENT 1

A cluster-supporting catalyst, comprising boron-substitute zeolite particles, and catalyst metal clusters supported within the pores of the boron-substitute zeolite particles.

EMBODIMENT 2

The cluster-supporting catalyst according to embodiment 1, wherein the catalyst metal clusters have positive charge, and are supported on the acid sites within the pores of the boron-substitute zeolite particles through an electrostatic interaction.

EMBODIMENT 3

The cluster-supporting catalyst according to embodiment 1 or 2, wherein the catalyst metal clusters are selected from a group consisting of rhodium clusters, palladium clusters, platinum clusters and copper clusters, and combinations thereof.

EMBODIMENT 4

The cluster-supporting catalyst according to any one of embodiments 1 to 3, which is an exhaust gas purification catalyst.

EMBODIMENT 5

The catalyst according to any one of embodiments 1 to 4, which is a catalyst for liquid-phase synthesis reaction, gas-phase synthesis reaction, or fuel cell reaction.

EMBODIMENT 6

The catalyst device, comprising the catalyst according to any one of embodiments 1 to 5 and a substrate supporting the catalyst.

EMBODIMENT 7

A method for producing a cluster-supporting catalyst,
wherein the cluster-supporting catalyst comprises boron-substitute zeolite particles, and catalyst metal clusters supported within the pores of the boron-substitute zeolite particles; and
wherein the method comprises the followings steps:
providing a dispersion liquid containing a dispersion medium and the boron-substitute zeolite particles dispersed in the dispersion medium, and
forming, in the dispersion liquid, catalyst metal clusters having a positive charge, and supporting the catalyst metal clusters on the acid sites within the pores of the boron-substitute zeolite particles through an electrostatic interaction.

EMBODIMENT 8

The method according to embodiment 7, wherein the dispersion liquid is provided by pulverizing the boron-substitute zeolite particles, and dispersing the pulverized boron-substitute zeolite particles in the dispersion medium.

EMBODIMENT 9

The method according to embodiment 7 or 8, wherein the clusters are formed in the dispersion liquid by any of the following methods:
a method of laser ablation in liquid,
a method of microwave ablation in liquid,
a method of plasma ablation in liquid, and
a positive-negative inversion method.

EMBODIMENT 10

The method according to embodiment 7 or 8, wherein the clusters are formed in the dispersion liquid by a method of reduction in liquid.

EMBODIMENT 11

The method according to embodiment 10, wherein the dispersion liquid is irradiated with plasma and/or microwave to promote reduction of an ion of the catalyst metal by the reducing agent.

EMBODIMENT 12

The method according to any one of embodiments 7 to 11, wherein the dispersion medium of the dispersion liquid is an organic solvent.

Effects of the Invention

According to the cluster-supporting catalyst of the present invention, an improved catalytic activity can be provided even after subjected to endurance treatment, especially hydrothermal endurance treatment.

BRIEF DESCRIPTION OF THE DRAWINGS

FIG. 1 is a graph illustrating heat resistance of supporting catalyst of Example 1, and Comparative Examples 1 to 3.

MODE FOR CARRYING OUT THE INVENTION

Figure 2A:
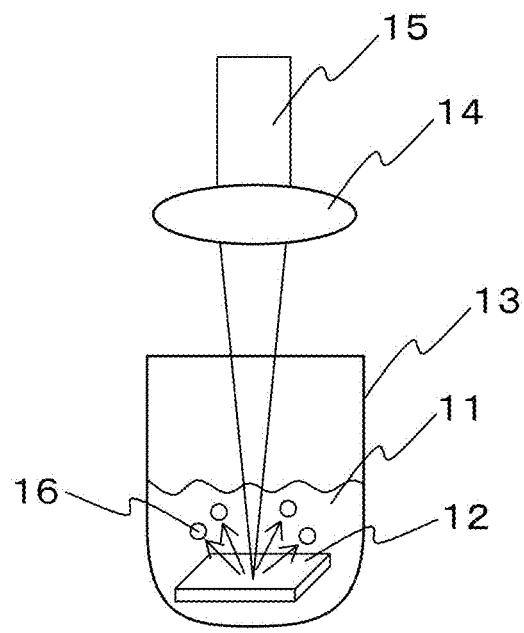
FIG. 2A is a diagram illustrating one embodiment of the method for producing the cluster-supporting catalyst of the present invention.

The embodiments of the present invention is described in detail below. The present invention is not limited to the following embodiments and can be implemented by making various modifications therein without departing from the scope of the gist of the present invention.

<<Cluster-Supporting Catalyst>>

The cluster-supporting catalyst of the present invention includes boron-substitute zeolite particles, and catalyst metal clusters supported within the pores of the boron-substitute zeolite particles. The cluster-supporting catalyst of the present invention can be produced by the method of the present invention described below. Further, the cluster-supporting catalyst of the present invention can be produced by an ion-exchange and reducing method in which catalyst metal ions are supported on boron-substitute zeolite particles through ion-exchange, and the supported catalyst metal ions are reduced by a reducing agent.

The catalyst metal clusters can having a positive charge, and be supported on the acid sites within the pores of the boron-substitute zeolite particles through an electrostatic interaction. The cluster-supporting catalyst of the present invention can be produced by the method of the present invention described below.

The cluster-supporting catalyst of the present invention has excellent low-temperature activity even after thermal endurance treatment, especially even after hydrothermal endurance treatment which is a thermal endurance treatment in an atmosphere containing water vapor, and this means that the cluster in the boron-substitute zeolite particles is stably maintained despite being subjected to thermal endurance treatment.

Although not to be bound by theory, the heat resistance, especially hydrothermal resistance of the cluster-supporting catalyst of the present invention is believed to be provided by the facts that catalyst metal is supported as clusters rather than as ions on the zeolite particles, and the zeolite particles supporting the clusters are boron-substitute zeolite particles, and thus interaction between the clusters and negative charge of the acid sites of the zeolite particles is delocalized, and this prevent collapse of the skeleton structure of the zeolite particles.

Particularly, in the case where catalyst metal supported in the pores of boron-substituted zeolite particles is in a state of cluster having positive charge, it is believed that the positive charge is delocalized among multiple atoms constituting cluster, and thus catalyst metal cluster delocally bonds to multiple acid cites in the boron-substituted zeolite particle, and as a result, relatively does not distort skeleton structure of the zeolite. On the other hand, in the case where catalyst metal supported in the pores of boron-substituted zeolite particles is in a state of single atom ion rather than cluster, it is believe that catalyst metal ion has at least one positive charge per one atom, and thus strongly bonds to one acid site having negative charge in the boron-substituted zeolite particle, and as a result, this strong bond distorts skeleton structure of the zeolite, and expedites collapse of zeolite structure, especially under hydrothermal endurance treatment condition.

Further, specifically, it is believed that, since the zeolite particles used in the present invention are boron-substituted zeolite particles in which at least part of aluminum atoms therein are substituted with boron atoms, rather than common zeolite particles, i.e. aluminosilicate zeolite particles, negative charge, which forms acid site, is also delocalized, and thereby expedites delocalized bond between cluster and acid site. Incidentally, the delocalization of negative charge is believed to be based on the fact that boron has a similar electronegativity to silicon in comparison with aluminum.

Aluminum: 1.61
Silicon: 1.90
Boron: 2.04

Also although not to be bound by theory, the heat stability of the clusters-supporting catalyst of the present invention, which is produced by the method of the present invention described below, are believed to be attributable to the fact that, for example, the clusters having a positive charge are stably fixed to the acid sites having a negative charge, and/or the clusters supported within the pores have a relatively uniform size.

Incidentally, the "cluster" is generally defined as an aggregate of up to several hundred chemical species, but in the present invention, the "cluster-supporting catalyst" means a catalyst in which a fine catalyst metal including a clusters are supported on the carrier particle.

The cluster-supporting catalyst of the present invention can be preferably used, for example, as an exhaust gas purification catalyst, a catalyst for liquid-phase compound synthesis reaction, a catalyst for gas-phase synthesis reaction or a catalyst for fuel cell reaction, particularly, as an exhaust gas purification catalyst.

<Catalyst Metal>

The catalyst metal constituting the catalyst metal clusters may be any metal or half-metal usable as a catalyst in the intended application. The catalyst metal is selected, for example, from the group consisting of gold, silver, platinum, palladium, rhodium, iridium, ruthenium, titanium, vanadium, chromium, manganese, iron, cobalt, nickel, copper, zinc, molybdenum, tungsten, rhenium, silicon, germanium, and a combination thereof.

The cluster-supporting catalyst obtained by the method of the present invention can stably maintain the catalytic activity of the catalyst metal, and the catalytic activity of the catalyst metal can thereby be provided while reducing the use amount of the catalyst metal. Accordingly, the method of the present invention is effective particularly when an expensive catalyst metal is used, for example, when a catalyst metal selected from the group consisting of platinum, palladium, rhodium, iridium ruthenium and a combination thereof is used as the catalyst metal.

Incidentally, in view of catalytic activity, the catalyst metal is preferably particles having a fine particle diameter. As described below regarding the method of the present invention for judging the metal particle size, the catalyst metal particles can be confirmed to have a fine particle diameter by utilizing a phenomenon that when the metal particles have a particle diameter of 1 nm or less, particularly, when the metal particles are of a cluster size, the metal particles emits fluorescence upon irradiation with excitation light.

<Boron-Substituted Zeolite Particle>

The boron-substituted zeolite particles may be any boron-substituted zeolite particles usable in the intended application In the present invention, the boron-substituted zeolite particles can have a structure in which at least part of aluminum atoms constituting aluminosilicate zeolite is substituted with boron atoms. For example, the substitute ratio of aluminum atom with boron atom is 10 atom % or more, 30 atom % or more, 50 atom % or more, 70 atom % or more, 90 atom % or more, or 95 atom % or more, and especially the boron-substituted zeolite particles can be ones which substantially do not contain aluminum atoms.

Also, the boron-substituted zeolite particles includes for example, A-type (code: LTA), ferrierite type (code: FER), MCM-22 type (code: MWW), ZSM-5 type, silicalite type (code: MFI), mordenite type (code: MOR), L-type (code: LTL), Y-type and X-type (code: FAU), beta-type (code: BEA), SSZ-type (code: CHA), and a combination thereof.

<<Catalyst Device>>

The catalyst device of the present invention includes the cluster-supporting catalyst of the present invention, a substrate supporting the cluster-supporting catalyst, and optionally, a vessel holding the substrate.

In the catalyst device of the present invention, a honeycomb substrate, particularly, a cordierite-made honeycomb substrate, can be used as the substrate. Furthermore, in the catalyst device of the present invention, a vessel made of a metal such as stainless steel can be used as the optional vessel.

<<Production Method of Cluster-Supporting Catalyst>>

In the method of the present invention for producing a cluster-supporting catalyst, a cluster-supporting catalyst, particularly, the cluster-supporting catalyst of the present invention, including boron-substituted zeolite particles having acid sites, and catalyst metal clusters supported within the pores of the boron-substituted zeolite particles, is produced.

This method includes: providing a dispersion liquid containing a dispersion medium and boron-substituted zeolite particles dispersed in the dispersion medium; and in the dispersion liquid, forming catalyst metal clusters having a positive charge, and supporting the catalyst metal clusters on the acid sites within the pores of the boron-substituted zeolite particles through an electrostatic interaction. The method may further include drying and firing the boron-substituted zeolite particles having supported thereon the catalyst metal clusters.

According to the method of the present invention, in a dispersion liquid in which boron-substituted zeolite particles is present, catalyst metal clusters are formed and the formed catalyst metal clusters are supported within the pores of the boron-substituted zeolite particles, whereby catalyst metal clusters having a controlled size, particularly, catalyst metal clusters having a relatively uniform size, can be supported within the pores of the boron-substituted zeolite particles. The size of the catalyst metal clusters can be controlled by adjusting the conditions for forming the catalyst metal clusters in the dispersion liquid.

In the method of the present invention, catalyst metal clusters can be supported within the pores of the boron-substituted zeolite particles through an electrostatic interaction between catalyst metal clusters and acid sites of the boron-substituted zeolite particles.

The electrostatic interaction enables the catalyst metal clusters having a positive charge to be supported on the acid sites within the pores of the boron-substituted zeolite particles having a negative charge.

<Catalyst Metal>

As to the catalyst metal usable in the method of the present invention, the description regarding the cluster-supporting catalyst of the present invention may be referred to.

<Boron-Substituted Zeolite Particle>

As to the boron-substituted zeolite particles usable in the method of the present invention, the description regarding the cluster-supporting catalyst of the present invention may be referred to.

The catalyst metal clusters having a positive charge can be supported on the acid sites within the pores of the boron-substituted zeolite particles having a negative charge. Accordingly, the boron-substituted zeolite particles preferably have a relatively small zeta potential and may have a zeta potential of, for example, −50 mV or less, −70 mV or less, −90 mV or less, or −100 mV or less. For the same reason, the boron-substituted zeolite particles preferably has a relatively large number of acid sites, i.e., has a relatively small Si/(Al and B) ratio, and may have an Si/(Al and B) ratio of, for example, 500 or less, 300 or less, 100 or less, or 50 or less.

In the method of the present invention, the dispersion liquid can be provided by pulverizing the boron-substituted zeolite particles and dispersing the pulverized boron-substituted zeolite particles in the dispersion medium.

In this case, since the boron-substituted zeolite particles are previously pulverized, the catalyst metal clusters can be accelerated to be supported within the pores of the boron-substituted zeolite particles. Incidentally, such a pulverized boron-substituted zeolite particles have sometimes become amorphous, and the boron-substituted zeolite particles may therefore be recrystallized, if desired, by annealing before or after the catalyst metal clusters are supported.

<Dispersion Medium of Dispersion Liquid>

As the dispersion medium of the dispersion liquid, any dispersion medium capable of drawing the catalyst metal clusters into the pores of the boron-substituted zeolite particles through an electrostatic interaction between the catalyst metal clusters and the acid sites of the boron-substituted zeolite particles can be used.

In this connection, in the case where the catalyst metal clusters are supported within the pores of the boron-substituted zeolite particles through an electrostatic interaction, the dispersion medium can be selected so that the surface of the catalyst metal clusters can have a positive charge and the acid sites within the pores of the boron-substituted zeolite particles can have a negative charge. Accordingly, in order to accelerate the catalyst metal clusters to be supported within the pores of the boron-substituted zeolite particles, the zeta potential and/or the ionization rate of the catalyst metal clusters and/or the boron-substituted zeolite particles can be adjusted by adjusting the pH of the dispersion medium and/or adding a salt to the dispersion medium.

As regards this, the surface potentials of the catalyst metal clusters and the boron-substituted zeolite particles cannot be directly measured but can be known indirectly by measuring the zeta potential (interfacial electrokinetic potential).

For example, the zeta potential of platinum cluster greatly depends on pH and when the pH is 8 or less, the zeta potential slightly increases as the pH decreases. This is considered to occur because the platinum atom on the surface of the platinum cluster has been partially oxidized and the platinum atom on a part of the platinum cluster surface is protonated into Pt—$H^+$ the moment the oxidized platinum atom enters the Pt—OH state along with decrease in pH, as a result, the positive charge density increases, leading to an increase in the zeta potential.

On the other hand, when the pH is more than 8, the zeta potential of the platinum cluster rapidly decreases as the pH increases. This is considered to occur because the platinum atom oxidized along with increase in pH becomes Pt—$O^-$ and furthermore, the platinum cluster surface is partially deprotonated, as a result, the positive charge density decreases, leading to a decrease in the zeta potential.

In the case of using an electrostatic interaction, the dispersion medium may be aqueous or nonaqueous, but it is generally preferable to use a nonaqueous dispersion medium, for example, an organic solvent. Because, if an aqueous dispersion medium is used, stabilization of the catalyst metal clusters occurs in the dispersion medium due to the high dielectric constant of water (dielectric constant: 80), i.e., the high polarity, and the catalyst metal clusters may thereby not be sufficiently supported within the pores of the boron-substituted zeolite particles.

On the other hand, in the case of using a dispersion medium having a relatively low polarity, i.e., a dispersion medium having a relatively low dielectric constant, the catalyst metal clusters are not stabilized in the dispersion medium and can be supported within the pores of the boron-substituted zeolite particles through an electrostatic interaction and stabilized there.

Accordingly, as the dispersion medium, a dispersion medium having a lower dielectric constant than that of water (dielectric constant: 80), for example, a dispersion medium having a dielectric constant of 50 or less, 40 or less, 30 or less, 25 or less, or 20 or less, can be used. Specifically, acetone (dielectric constant: 20), 2-propanol (dielectric constant: 18), ethanol (dielectric constant: 25), methanol (dielectric constant: 32), carbon tetrachloride (dielectric constant: 2.2), etc. can be used as the dispersion medium.

<Formation of Catalyst Metal Cluster>

The catalyst metal cluster, particularly, the catalyst metal clusters having a positive charge, can be formed by any method in the dispersion medium. The method for forming such catalyst metal clusters includes methods such as method of laser ablation in liquid, method of microwave ablation in liquid, method of plasma in liquid, positive-negative inversion method and method of reduction in liquid (liquid-phase reduction method).

The method of laser ablation in liquid, method of microwave ablation in liquid and method of plasma ablation in liquid are a method of forming catalyst metal clusters by irradiating a catalyst metal target disposed in a dispersion medium with laser, microwave or plasma.

In the positive-negative inversion method, first, negatively charged zeolite and a metal ion source having a negative charge are caused to be present together in a solution, particularly, in an aqueous solution. Specifically, for example, in the case of using $H_2[PtCl_6]$, platinum is caused to be present as a negative ion of $[PtCl_6]^{2-}$. In this state, an ion exchanger is not produced due to repulsive force between negative charges. A pulsed laser is converged and introduced into this solution. According to this introduction, a plasma is generated in the laser focus region to produce various chemical species (a metal ion from which a ligand is removed, a plasma metal ion produced after electron detachment of a negative metal ion source, etc.) from the metal ion source, and furthermore, a neutral metal atom forms an aggregate with a positive metal ion to produce a positively charged metal clusters. The positively charged metal cluster produced in this way is supported on the acid sites of zeolite through an electrostatic interaction.

The method of reduction in liquid is a method of forming catalyst metal clusters by reducing the catalyst metal ion with use of a reducing agent.

In the method of reduction in liquid, any reducing agent capable of reducing the catalyst metal ion in liquid can be used. Specifically, for example, a hydride reducing agent such as sodium borohydride, and an alcohol such as propanol, can be used as the reducing agent. In addition, in the method of reduction in liquid, it is also preferable to use a dispersion medium stable to the reducing agent used, which is a dispersion medium capable of dissolving a metal salt as a catalyst metal ion supply source and the reducing agent. Accordingly, the same compound can be used for both the reducing agent and the dispersant, for example, an alcohol can be used for both the reducing agent and the dispersant.

In the method of reduction in liquid, the reduction of the catalyst metal ion may be promoted by optionally using microwave or plasma in liquid, in addition to the reducing agent.

Incidentally, in order to form catalyst metal clusters having a controlled size, e.g., catalyst metal clusters having a relatively uniform size, for example, in the method of reduction in liquid, uniform reduction of the catalyst metal ion can be promoted in the dispersion liquid by optionally using microwave or plasma in liquid, in addition to the reducing agent.

The present invention is described in greater detail below by referring to Examples, but needless to say, the scope of the present invention is not limited by these Examples.

EXAMPLES

Example 1, and Comparative Examples 1 and 2

Example 1

Rhodium cluster-supporting boron-substituted zeolite were produced by a laser abrasion method of rhodium target in acetone.

Example 1

Figure 2B:
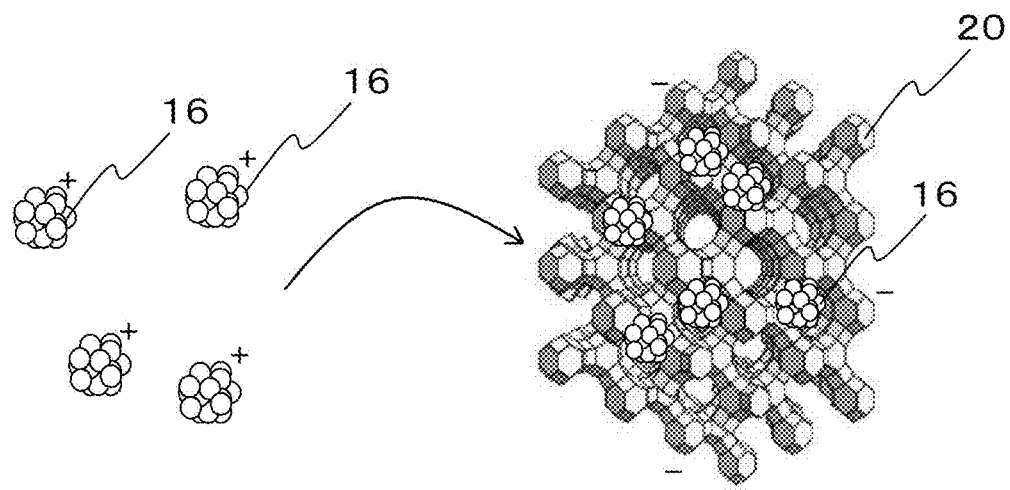
FIG. 2B is a diagram illustrating one embodiment of the method for producing the cluster-supporting catalyst of the present invention.

As illustrated in FIG. 2A, acetone 11 as a dispersion medium having dispersed therein carrier particles (not shown) was put in a vessel 13, a plate 12 of rhodium was placed in acetone 11, the plate 12 of rhodium in acetone 11 was irradiated with a laser 15 through a lens 14, and a rhodium cluster 16 was formed in the acetone by laser ablation. The thus-formed rhodium cluster 16 took on a positive charge and therefore, as illustrated in FIG. 2B, was electrically drawn to sites having a negative charge, i.e., acid sites, of the carrier particles of zeolite carrier particles 20, and supported there.

The laser light was the basic wave (1,064 nm, 10 Hz) of a Nd:YAG laser, and the intensity thereof was 2 W.

The carrier particles supporting the clusters were taken out from the acetone, dried at about 25° C. for about 1 hour, and fired at 300° C. for 2 hours to obtain the catalyst of Example 1 in which rhodium clusters were supported on the boron-substituted zeolite particles.

In Example 1, the carrier particles and the laser irradiation time were as follows:

Carrier particle: MFI-type boron-substituted zeolite (B-MFI) (Si/B ratio: 91, Substitute ratio aluminum with boron: 100%))

Laser irradiation time: 9 hours

Amount of rhodium supported: 0.2 mass %

Incidentally, the boron-substituted zeolite particles used in Example 1 were prepared by a microwave heating method according to the method of Non-Patent Document 1 above.

Comparative Example 1

The catalyst of Comparative Example 1, in which rhodium clusters are supported on the common silica-alumina zeolite particles (MFI-type zeolite (Al-MFI) (Si/Al ratio: 40)), was obtained in the same manner as in Example 1 except that non-substituted common silica-alumina zeolite particles were used in place of boron-substituted zeolite particles. The amount of rhodium supported was 0.2 mass %.

Comparative Example 2

The catalyst of Comparative Example 2, in which rhodium ions are supported on boron-substituted zeolite particles, was obtained by supporting rhodium on the boron-substituted zeolite particles used in Example 1 through ion exchange method. The amount of rhodium supported was 0.0027 mass %.

More specifically, in this comparative example, the catalyst of Comparative Example 2 was obtained by dispersing B-MFI in a 10 mM rhodium nitrate (III) aqueous solution, stirring the resulted solution for 15 hours, taking the B-MFI from the aqueous solution, drying the thus obtained B-MFI for 1 hour at the temperature of about 25° C., and then firing the thus obtained B-MFI for 2 hours at the temperature of 300° C.

Comparative Example 3

The catalyst of Comparative Example 3, in which rhodium ions are supported on common silica-alumina zeolite particles, was obtained by supporting rhodium on the common silica-alumina zeolite particles used in Comparative Example 1 through ion exchange method similar to that used in Comparative Example 2. The amount of rhodium supported was 0.034 mass %.

<Evaluation>

For the rhodium cluster-supporting boron-substituted zeolite catalyst of Example 1, the rhodium cluster-supporting silica-alumina zeolite catalyst of Comparative Example 1, the rhodium ion-exchanged boron-substituted zeolite catalyst of Comparative Example 2, and the rhodium ion-exchanged silica-alumina zeolite catalyst of Comparative Example 3, hydrothermal endurance treatment was conducted at the temperature of 900° C. (Comparative Example 3) or 950° C. (Example 1, and Comparative Examples 1 and 2) in the atmosphere having 20% water vapor pressure.

For samples subjected to the above hydrothermal endurance treatment, CO 50% purification temperature were evaluated through CO oxidation reaction in a dry reaction gas atmosphere of 800° C. and 1 atm. Incidentally, the evaluation was conducted such that the total amount of rhodium supported on zeolite became the same.

The reaction gas composition was CO: 0.3%, O2: 8%, and He: balance. The space velocity was 10,000.

The evaluation result is shown in FIG. 1. As shown the figure, the rhodium cluster-supporting boron-substituted zeolite catalyst of Example 1 has excellent catalytic property before the endurance treatment, and degradation of the catalytic property after the hydrothermal endurance treatment was small.

The catalytic properties of rhodium-supporting zeolites of Comparative Examples 1 and 3, in which common silica-alumina zeolite (Al-MFI) was used in place of boron-substituted zeolite (B-MFI), were degraded by hydrothermal endurance treatment, regardless whether rhodium is supported on zeolite as clusters (Comparative Example 1) or as ion (Comparative Example 3). This is believed to be because silica-alumina zeolite is less heat resistive, and thus the zeolite structure thereof is deformed by water vapor used in the hydrothermal endurance treatment.

Incidentally, the heat endurance treatment was conducted at 950° C. for the catalysts of Example 1, and Comparative Examples 1 and 2, while the heat endurance treatment was conducted at 900° C. for the catalyst of Comparative Example 3. However, the catalyst of Comparative Example 3 more degraded than the catalyst of other examples. Therefore, it is understood that the catalyst of Comparative Example 3 would have more remarkably degraded if the hydrothermal endurance treatment at 950° C. is used for the catalyst of Comparative Example 3.

Before the hydrothermal endurance treatment, the catalyst activity of rhodium-ion-exchanged boron-substituted zeolite catalyst of Comparative Example 2 was lower than the catalyst activity of the catalyst of Example 1, the catalyst of Comparative Example 2 using the boron-substituted zeolite as in the case of Example 1 while supporting rhodium as ions rather than clusters. Further, after the hydrothermal endurance treatment at 950° C., the catalyst activity of the catalyst of Comparative Example 2 more degraded than that of Example 1. This is believed to be because the bonding between the rhodium ions and the acid site of the rhodium-ion-exchanged boron-substituted zeolite is strong, and the strong bonding deforms the skeleton structure of the zeolite and then expedite the collapse of the zeolite structure.

In the following Reference Example and Comparative Reference Examples, which corresponds to Examples and Comparative Examples of Reference 5 above, it is shown that metal clusters can be supported in the pore of the zeolite particles by the method of the present invention, and that the thus produced catalyst supporting catalyst metal cluster in the pores thereof exhibit superior exhaust gas purifying activity.

Reference Examples 1 and 2 and Reference Comparative Example 1

In Reference Examples 1 and 2 and Reference Comparative Example 1, gold clusters were formed by a laser ablation method of gold target in acetone, and the gold clusters were supported on carrier particle to prepare a supported gold-cluster catalyst. The catalysts obtained in Reference Examples 1 and 2 and Reference Comparative Example 1 were evaluated for the fluorescence spectrum. The catalyst of Reference Example 1 was evaluated also for the supporting rate in pore.

Reference Example 1

As illustrated in FIG. 2A, acetone 11 as a dispersion medium having dispersed therein carrier particles (not shown) was put in a vessel 13, a plate 12 of gold was placed in acetone 11, the plate 12 of gold in acetone 11 was irradiated with a laser 15 through a lens 14, and a gold cluster 16 was formed in the acetone by laser ablation. The thus-formed gold cluster 16 took on a positive charge and therefore, as illustrated in FIG. 2B, was electrically drawn to sites having a negative charge, i.e., acid sites, of the carrier particles of zeolite carrier particles 20, and supported there.

The laser light was the basic wave (1,064 nm, 10 Hz) of a Nd:YAG laser, and the intensity thereof was 2 W.

The carrier particles supporting the clusters were taken out from the acetone, dried at about 25° C. for about 1 hour, and fired at 300° C. for 2 hours to obtain the supported gold-cluster catalyst of Reference Example 1.

In Reference Example 1, the carrier particles and the laser irradiation time were as follows:
Carrier particle: ZSM-5 zeolite (MFI) (Si/Al ratio: 1,500)
Laser irradiation time: 2 hours and 45 minutes Reference Example 2

The supported gold-cluster catalyst of Reference Example 2 was obtained in the same manner as in Reference Example 1 except that the carrier particles and the laser irradiation time were as follows:
Carrier particle: ZSM-5 zeolite (MFI) (Si/Al ratio: 1,500)
Laser irradiation time: 12 hours and 30 minutes Incidentally, since the ablation efficiency differs depending on the surface state of the carrier particles or the plate of gold, in Reference Example 2 and Reference Comparative Example 1, the laser ablation time was adjusted to provide the same amount of ablation of gold as in Reference Example 1. The amount of ablation of gold was judged from the change in color of the dispersion medium.

Reference Comparative Example 1

The supported gold-cluster catalyst of Reference Comparative Example 1 was obtained in the same manner as in Reference Example 1 except that the carrier particles and the laser irradiation time were as follows:
Carrier particle: fumed silica
Laser irradiation time: 30 minutes
<Evaluation: Fluorescence Spectrum>

Figure 3A:
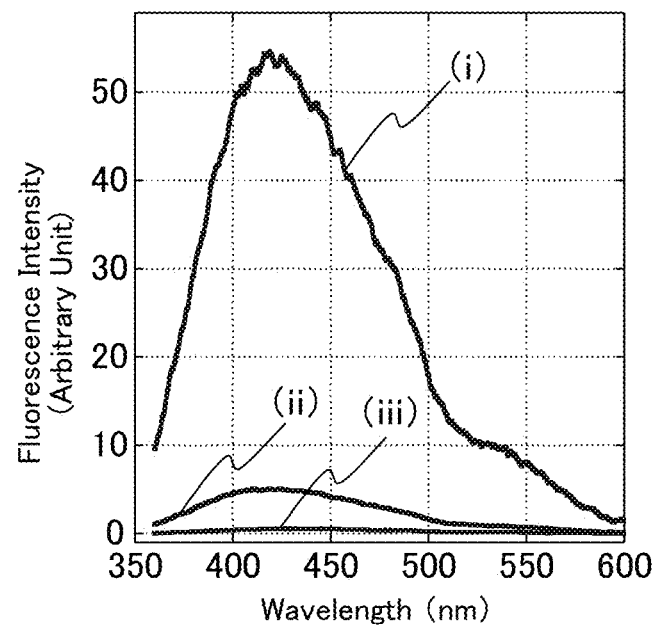
FIG. 3A is a graph illustrating the fluorescence spectra with respect to the supported gold-cluster catalysts of Reference Examples 1 and 2 and Reference Comparative Example 1.

With respect to the supported gold-cluster catalysts of Reference Examples 1 and 2 and Reference Comparative Example 1, the measurement of fluorescence spectrum (excitation wavelength: 350 nm) was performed. FIG. 3A depicts a graph illustrating the evaluation results of fluorescence spectrum normalized to the intensity per 1 mg of gold. In FIG. 3A, the result as to Reference Example 1 is indicated by the spectrum (i), the result as to Reference Example 2 is indicated by the spectrum (ii), and the result as to Reference Comparative Example 1 is indicated by the spectrum (iii).

In FIG. 3A, the fluorescence signal at near 400 nm is a spectrum in which fluorescent emissions from the gold cluster of about 8-mer were overlapped. Accordingly, FIG. 3A indicates that in the supported gold-cluster catalysts of Reference Examples 1 and 2, particularly, in the supported gold-cluster catalyst of Reference Example 1, a relatively large amount of a gold cluster around 8-mer is supported on the carrier particle.

Figure 3B:
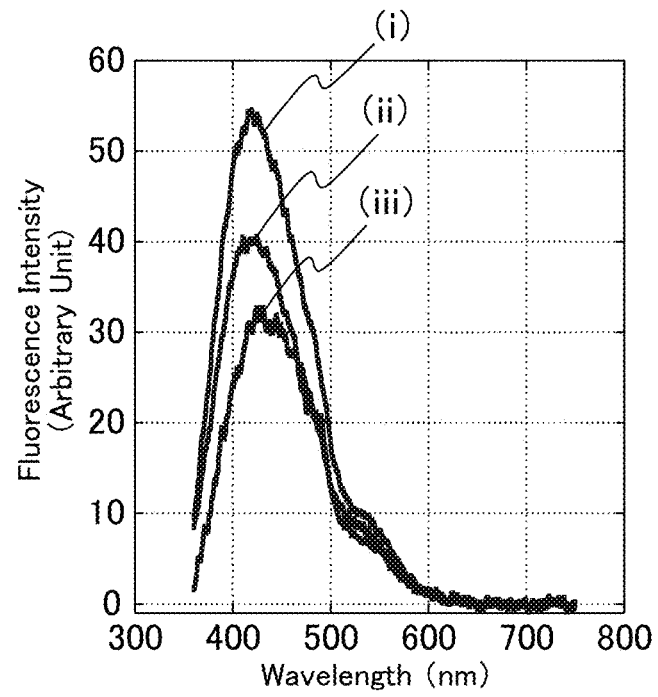
FIG. 3B is a graph illustrating the fluorescence spectra with respect to the supported gold-cluster catalysts of Reference Examples 1 and 2 and Reference Comparative Example 1, the result as to Reference Example 1 (spectrum (i)) being depicted at 1-fold magnification, the result as to Reference Example 2 (spectrum (ii)) being depicted at 8-fold magnification, and the result as to Reference Comparative Example 1 (spectrum (iii)) being depicted at 60-fold magnification, for the sake of examination.

In FIG. 3B, for the sake of examination, based on the spectra of FIG. 3A, the result as to Reference Example 1 (spectrum (i)) is depicted at 1-fold magnification, the result as to Reference Example 2 (spectrum (ii)) is depicted at 8-fold magnification, and the result as to Reference Comparative Example 1 (spectrum (iii)) is depicted at 60-fold magnification.

Compared with the results (spectra (i) and (ii)) as to Reference Examples 1 and 2 where the gold clusters were supported on zeolite, the result (spectrum (iii)) as to Reference Comparative Example 1 where the gold clusters were supported on fumed silica is shifted to the long wavelength side. Thus suggests that the particle diameter of the gold cluster supported on fumed silica of Reference Comparative Example 1 is larger than that of the gold cluster supported on zeolite of Reference Examples 1 and 2. Incidentally, the peak near 550 nm is derived from Mie scattering by nanoparticles attached to the carrier particle surface simultaneously with the clusters.

<Other Metals>

In Reference Examples 1 to 2 and Reference Comparative Example 1, a gold clusters were formed by using a gold target. In this connection, as to the following metals, it was confirmed that clusters of the metal can be formed in the same manner as in Reference Example 1 by the method of laser ablation in liquid using the metal as the target:

Aluminum, silicon, titanium vanadium, chromium, manganese, iron, cobalt, nickel, copper, zinc, gallium, germanium zirconium niobium, silver, rhodium ruthenium, palladium, indium, tin, tantalum, tungsten, iridium, platinum, and cerium.

It was also confirmed that out of these metal clusters, as to copper, silver, rhodium, ruthenium palladium and platinum, fluorescence is observed upon irradiation with excitation light. In addition, it was confirmed that out of these metal clusters, as to copper, silver, rhodium, ruthenium and platinum, fluorescence is observed upon irradiation with excitation light also when clusters formed by the ion exchange-reduction method are supported on a zeolite carrier particle.

Reference Example 3

In Reference Example 3, a supported copper-cluster catalyst in which copper clusters are supported on a zeolite carrier particles was prepared in the same manner as in Reference Example 1 except that a copper target was used in place of the gold target and a ZSM-5 zeolite carrier particles (MFI) (Si/Al ratio: 40) were used as the zeolite carrier particle. The obtained catalyst was evaluated for the fluorescence spectrum.

Unlike the gold, the copper is oxidized in air, and the copper cluster immediately after preparation was in the oxide state. Accordingly, the supported copper-cluster catalyst immediately after preparation did not emit fluorescence.

Figure 4:
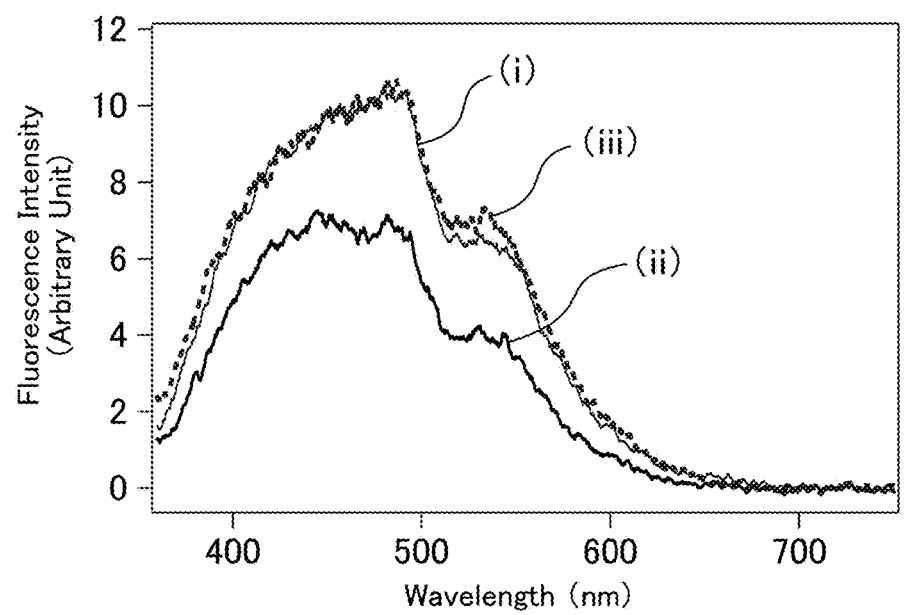
FIG. 4 is graph illustrating the fluorescence spectra before oxidation treatment and reduction treatment with respect to the supported copper-cluster catalyst of Reference Example 3.

Then, the obtained supported copper-cluster catalyst was heated at 300° C. for 2 hours in a hydrogen atmosphere, effecting a reduction treatment, and thereafter evaluated for the fluorescence intensity. Consequently, the supported copper-cluster catalyst subjected to a reduction treatment exhibited fluorescence. The result of the fluorescence intensity evaluation (excitation wavelength: 350 nm) is illustrated as the spectrum (i) in FIG. 4. In this spectrum (i), the fluorescence of 400 to 500 nm corresponds to the already-reported fluorescence signals of 8-mer and 9-mer of copper.

Subsequently, the supported copper-cluster catalyst was left standing overnight in an air atmosphere, effecting an oxidation treatment, and again evaluated for the fluorescence intensity. Consequently, the supported copper-cluster catalyst left standing in an air atmosphere exhibited fluorescence, though the intensity was weak compared with that before the treatment in an air atmosphere. The result of fluorescence intensity evaluation is illustrated as the spectrum (ii) in FIG. 4.

Subsequently, the supported copper-cluster catalyst left standing in an air atmosphere was again subjected to the above-described reduction treatment and again evaluated for the fluorescence intensity. Consequently, the supported copper-cluster catalyst again subjected to the reduction treatment exhibited the same fluorescence as that before the treatment in an air atmosphere. The result of the fluorescence intensity evaluation is illustrated as the spectrum (iii) in FIG. 4.

The supported copper-cluster catalyst after performing oxidation treatment and reduction treatment thus exhibited the same fluorescence as that before these treatments, and this suggests that the copper clusters are held within the pores of the zeolite carrier particles and in turn, a change such as aggregation of the copper clusters are not caused by these treatments.

Reference Example 4 and Reference Comparative Example 2

In Reference Example 4 and Reference Comparative Example 2, the rhodium cluster-supporting catalyst (Reference Example 4) and a commercially available exhaust gas purification catalyst (Reference Comparative Example 2) were evaluated for the catalytic activity.

Specifically, Reference Example 4 and Reference Comparative Example 2 were conducted as follows.

Reference Example 4

In Reference Example 4, rhodium clusters were supported on a zeolite carrier particles in the same manner as in Reference Example 1 except that a rhodium target was used in place of the gold target and a beta-type zeolite carrier particles (BEA) (Si/Al ratio: 40) were used as the zeolite carrier particle.

The temperature ($T_{CO(50\%)}$) when consuming 50% of the supplied carbon monoxide was evaluated by repeating an operation of heating 30 mg of the obtained rhodium cluster-supporting catalyst ($Rh_{cluster}$/BEA) for about 24 hours in an electric furnace at a heating rate of 12° C./min to a peak heating temperature of 640 to 800° C. from room temperature while flowing an evaluation gas having the following composition over the catalyst, and cooling it to room temperature.

Carbon monoxide (CO): 0.3%
Oxygen ($O_2$): 8%
Helium (He): balance

Figure 5:
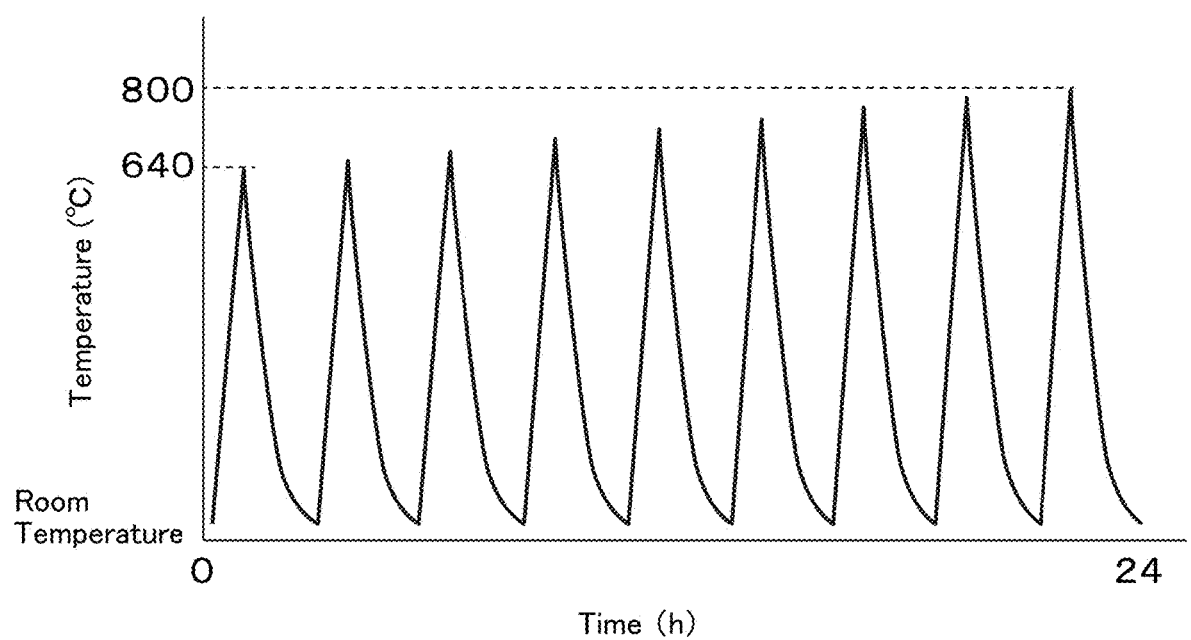
FIG. 5 is a graph illustrating the temperature change for the evaluation of catalytic activity.

With respect to the temperature change in the above-described repetitive step of heating and cooling, as illustrated in FIG. 5, the peak heating temperature becomes higher as it goes to the latter half, and a total of about 24 hours was spent.

In the repetitive step of heating and cooling, the evaluation was performed while raising the evaluation gas temperature to the peak heating temperature, i.e., in the temperature rising process. Similarly, in the repetitive step of heating and cooling, the evaluation was performed while lowering the evaluation gas temperature from the peak heating temperature, i.e., in the temperature dropping process.

Reference Comparative Example 2

For reference, with respect to a commercially available exhaust gas purification catalyst ($Rh/Al_2O_3$—$CeO_2$—$ZrO_2$) as Reference Comparative Example 2, the evaluations in the temperature rising process and the temperature dropping process were performed in the same manner as in Reference Example 4.

<Evaluation: Durability>

Figure 6A:
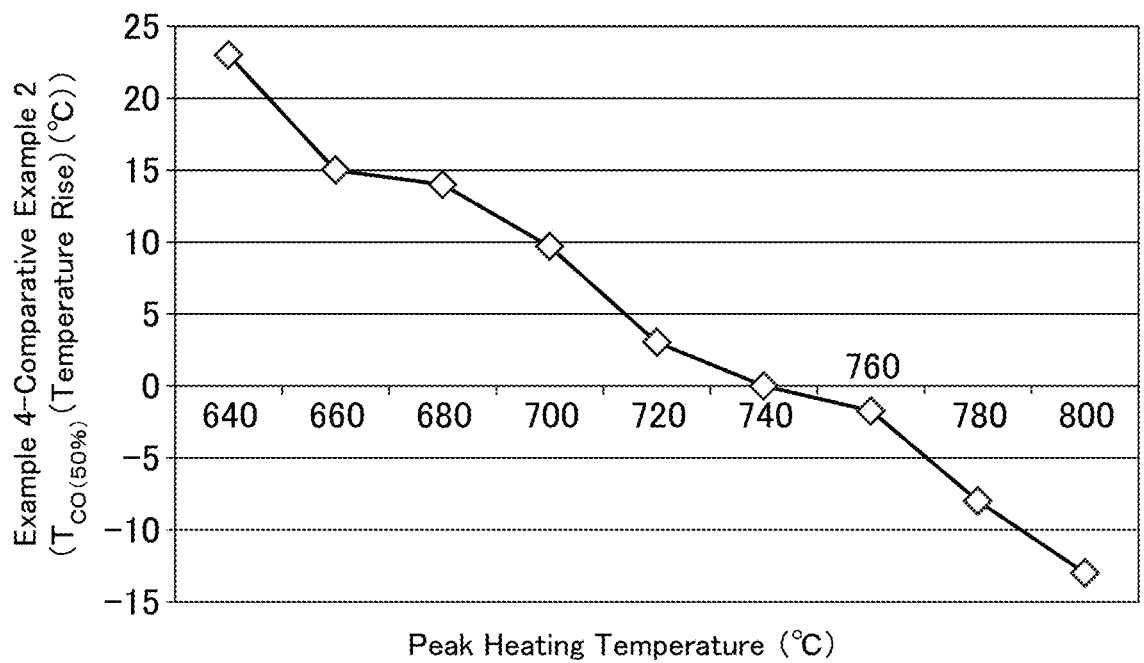
FIG. 6A is a graph illustrating the carbon monoxide purification performance in the temperature rising process with respect to the rhodium cluster-supporting catalysts of Reference Example 4 and Reference Comparative Example 2.
Figure 6B:
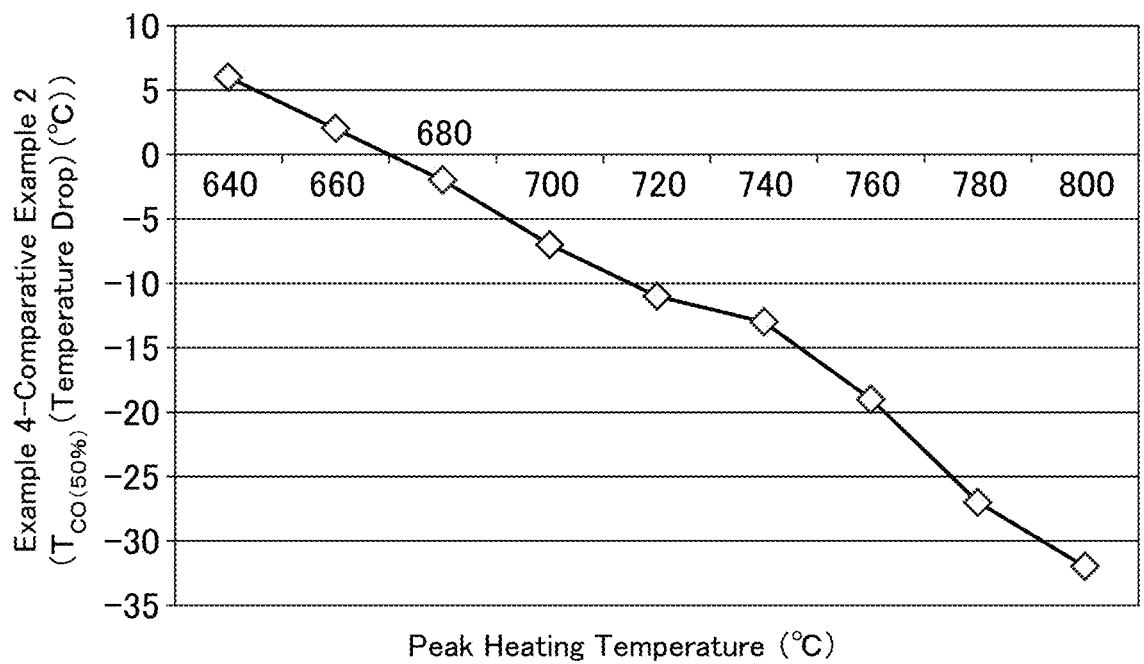
FIG. 6B is a graph illustrating the carbon monoxide purification performance in the temperature dropping process with respect to the rhodium cluster-supporting catalysts of Reference Example 4 and Reference Comparative Example 2.

The evaluation results in the temperature rising process and the temperature dropping process are illustrated respectively in FIGS. 6A and 6B as the difference between the result of Reference Example 4 and the result of Reference Comparative Example 2 ($T_{CO(50\%)}$ of Reference Example 4)-($T_{CO(50\%)}$ of Reference Comparative Example 2). When the difference above takes a minus value, this indicates that $T_{CO(50\%)}$ of Reference Example 4 is lower than $T_{CO(50\%)}$ of Reference Comparative Example 2, i.e., the low-temperature activity of the catalyst of Reference Example 4 is excellent. In FIG. 6, the abscissa indicates the temperature (the peak temperature in FIG. 5) at which an accelerated deterioration treatment was performed.

It is understood from FIGS. 6A and 6B that the catalyst of Reference Example 4 provides an excellent exhaust gas purification performance relative to the catalyst of Reference Comparative Example 2 as the peak heating temperature becomes higher. This indicates that the catalyst of Reference Example 4 is less likely to deteriorate compared with the catalyst of Reference Comparative Example 2.

Although not to be bound by theory, it is considered that in the catalyst of Reference Comparative Example 2, rhodium of various sizes ranging from the monoatomic level to the submicrometer level was supported on the carrier to randomly cause sintering of rhodium particles by heat at the peak heating temperature and the catalyst was thereby deteriorated, whereas in the catalyst of Reference Example 4, rhodium clusters were stably maintained within the pores of zeolite and in turn, the catalyst was not deteriorated due to heat at the peak heating temperature.

Incidentally, the change when the peak heating temperature is 640° C. and 660° C. is a change in the firing process of removing water molecules adsorbed to zeolite and therefore, the catalytic activity needs to be evaluated from the change substantially when the peak heating temperature is 700° C. or more.

Reference Example 5 and Reference Comparative Example 3

In Reference Example 5 and Reference Comparative Example 3, a catalyst in which rhodium clusters are supported on zeolite carrier particles or fumed silica carrier particles was obtained, and with respect to the obtained catalysts, the durability of the catalyst was evaluated.

Specifically, Reference Example 5 and Reference Comparative Example 3 were conducted as follows.

Reference Example 5

In Reference Example 5, rhodium clusters were supported on zeolite carrier particles in the same manner as in Reference Example 1 except that a rhodium target was used in place of the gold target and beta-type zeolite carrier particles (BEA) (Si/Al ratio: 40) were used as the zeolite carrier particle.

With respect to the obtained rhodium cluster-supporting catalyst ($Rh_{cluster}$/BEA), the temperature ($T_{CO(50\%)}$) when consuming 50% of the supplied carbon monoxide was evaluated in the temperature rising process and in the temperature dropping process in the same manner as in Reference Example 4.

Reference Comparative Example 3

In Reference Comparative Example 3, rhodium clusters were supported on a fumed silica particle in the same manner as in Reference Example 1 except that a rhodium target was used in place of the gold target and a fumed silica particle was used as the carrier particle.

With respect to this rhodium cluster-supporting catalyst ($Rh_{cluster}$/silica), the temperature ($T_{CO(50\%)}$) when consuming 50% of the supplied carbon monoxide was evaluated in the temperature rising process and in the temperature dropping process in the same manner as in Reference Example 4.

<Evaluation: Durability>

Figure 7A:
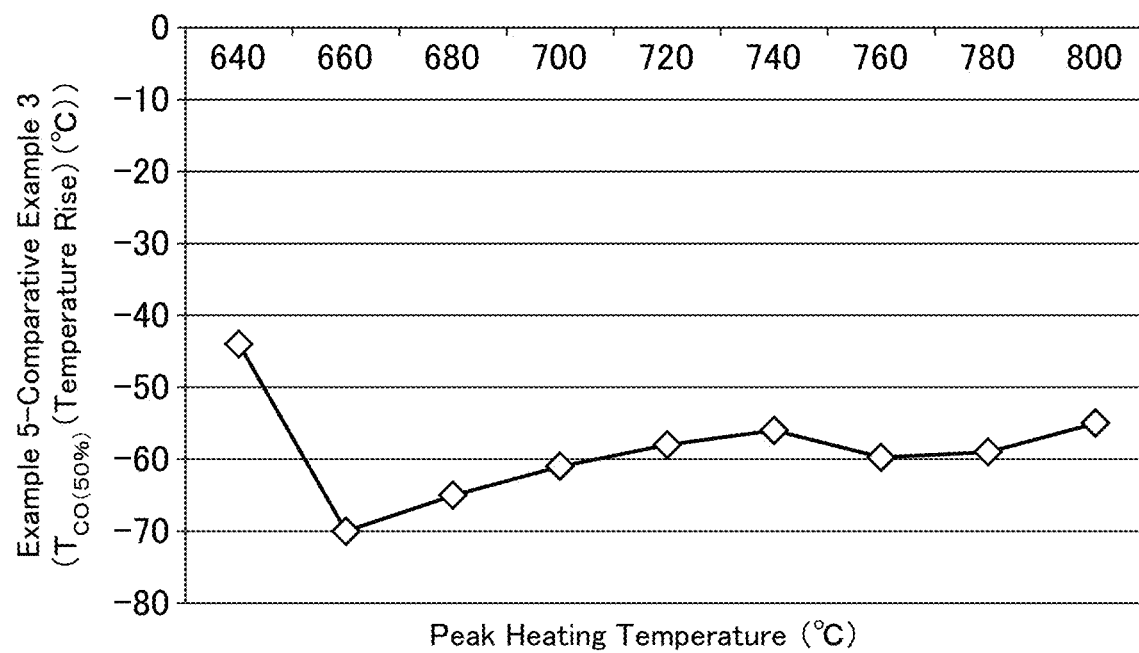
FIG. 7A is a graph illustrating the carbon monoxide purification performance in the temperature rising process with respect to the rhodium cluster-supporting catalysts of Reference Example 5 and Reference Comparative Example 3.
Figure 7B:
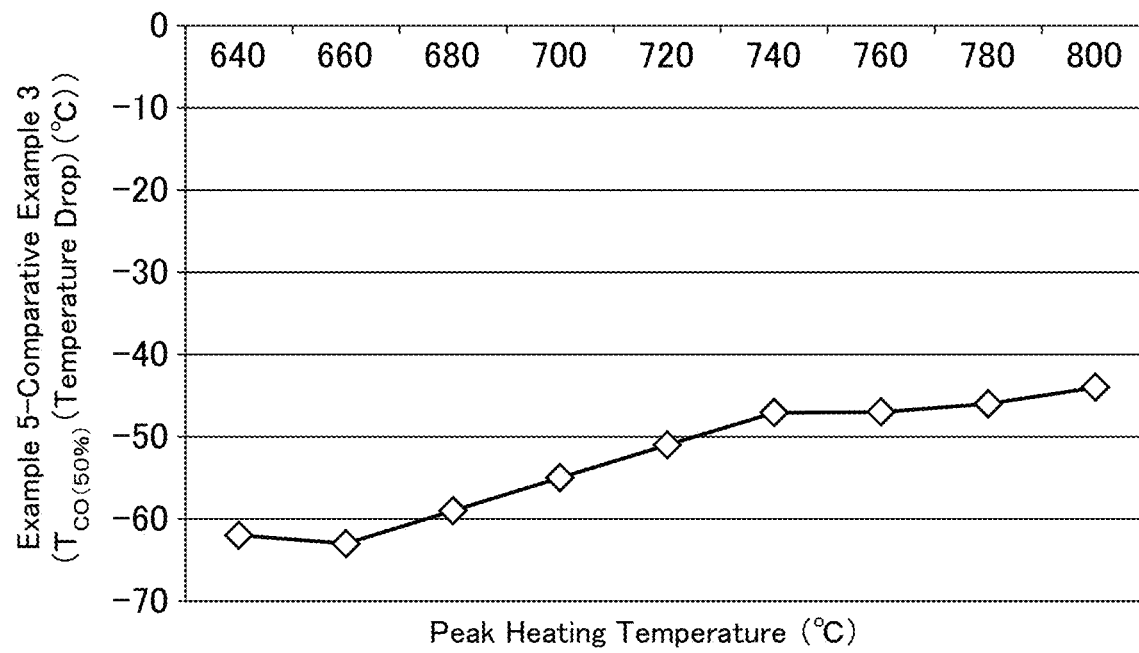
FIG. 7B is a graph illustrating the carbon monoxide purification performance in the temperature dropping process with respect to the rhodium cluster-supporting catalysts of Reference Example 5 and Reference Comparative Example 3.

The evaluation results in the temperature rising process and the temperature dropping process are illustrated respectively in FIGS. 7A and 7B as the difference between the result of Reference Example 5 and the result of Reference Comparative Example 3 ($T_{CO(50\%)}$ of Reference Example 5)-($T_{CO(50\%)}$ of Reference Comparative Example 3). When the difference above takes a minus value, this indicates that $T_{CO(50\%)}$ of Reference Example 5 is lower than $T_{CO(50\%)}$ of Reference Comparative Example 3, i.e., the low-temperature activity of the catalyst of Reference Example 5 is excellent. In FIG. 7, the abscissa indicates the temperature (the peak temperature in FIG. 5) at which an accelerated deterioration treatment was performed.

It is understood from FIGS. 7A and 7B that the catalyst ($Rh_{cluster}$/BEA) of Reference Example 5 in which rhodium clusters are supported on beta-type zeolite carrier particles (BEA) has a significantly excellent low-temperature activity at all peak heating temperatures, compared with the catalyst ($Rh_{cluster}$/silica) of Reference Comparative Example 3 in which rhodium clusters are supported on a fumed silica carrier particle.

Although not to be bound by theory, this is considered to be attributable to the fact that since fumed silica used in the catalyst of Reference Comparative Example 3 does not have a pore, the rhodium clusters were supported only on the surface thereof and in the process of the rhodium being supported on the carrier and/or during the accelerated deterioration treatment, the rhodium cluster underwent aggregation or grain growth, i.e., the fact that while the rhodium cluster of the catalyst of Reference Example 5 is stably maintained within the pores of the zeolite carrier, the rhodium cluster of the catalyst of Reference Comparative Example 3 is present on the outer surface of the fumed silica carrier.

Reference Example 6 and Reference Comparative Example 4

In Reference Example 6 and Reference Comparative Example 4, a catalyst was obtained by supporting or not supporting a rhodium cluster on zeolite carrier particles, and the obtained catalysts were evaluated for the durability.

Specifically, Reference Example 6 and Reference Comparative Example 4 were conducted as follows.

Reference Example 6

In Reference Example 6, rhodium clusters were supported on zeolite carrier particles in the same manner as in Reference Example 1 except that a rhodium target was used in place of the gold target and ZSM-5 zeolite carrier particles (MFI) (Si/Al ratio: 40) were used as the zeolite carrier particle.

With respect to the obtained rhodium cluster-supporting catalyst (Rh$_{cluster}$/MFI), the temperature (T$_{CO(50\%)}$) when consuming 50% of the supplied carbon monoxide was evaluated in the temperature rising process and in the temperature dropping process in the same manner as in Reference Example 4.

Reference Comparative Example 4

In Reference Comparative Example 4, rhodium clusters were dispersed in acetone in the same manner as in Reference Example 1 except that a rhodium target was used in place of the gold target and carrier particles was not used. Thereafter, at the stage where the rhodium clusters were aggregated to form a rhodium cluster aggregate particles, ZSM-5 zeolite carrier particles (MFI) (Si/Al ratio: 40) was added as the zeolite carrier particles to the acetone to prepare the catalyst (Rh$_{particle}$/MFI) of Reference Comparative Example 4 in which the rhodium cluster aggregate particle was supported on the ZSM-5 zeolite carrier particles (MFI).

With respect to this rhodium aggregate particle-supported catalyst (Rh$_{particle}$/MFI), the temperature (T$_{CO(50\%)}$) when consuming 50% of the supplied carbon monoxide was evaluated in the temperature rising process and in the temperature dropping process in the same manner as in Reference Example 4.

<Evaluation: Durability>

Figure 8A:
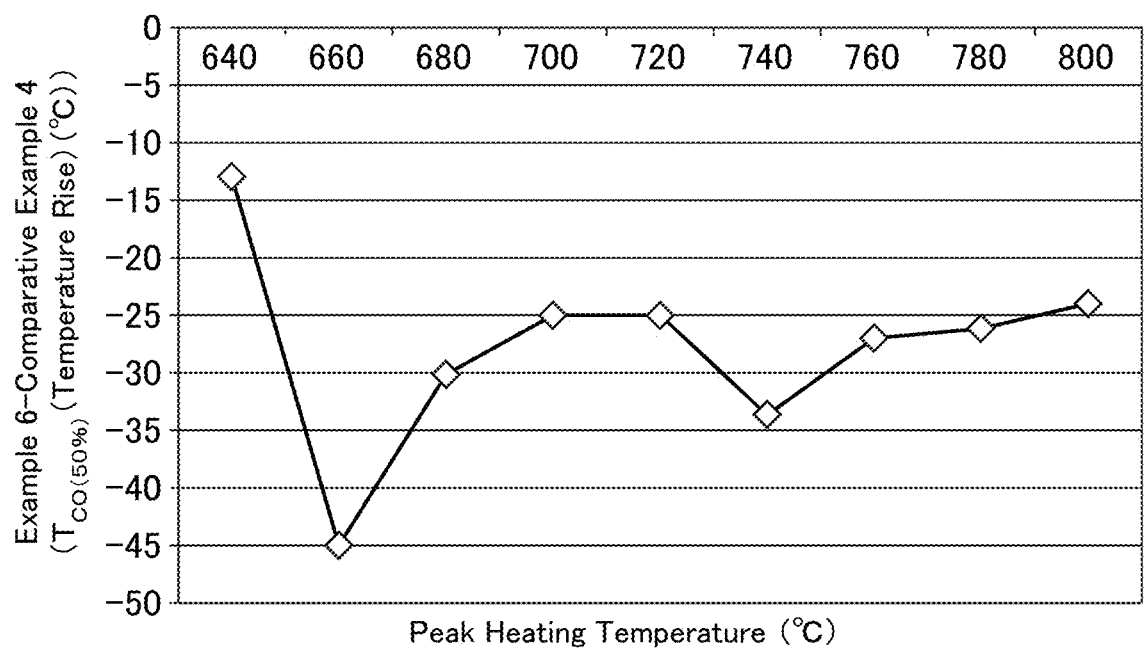
FIG. 8A is a graph illustrating the carbon monoxide purification performance in the temperature rising process with respect to the rhodium-supported catalysts of Reference Example 6 and Reference Comparative Example 4.
Figure 8B:
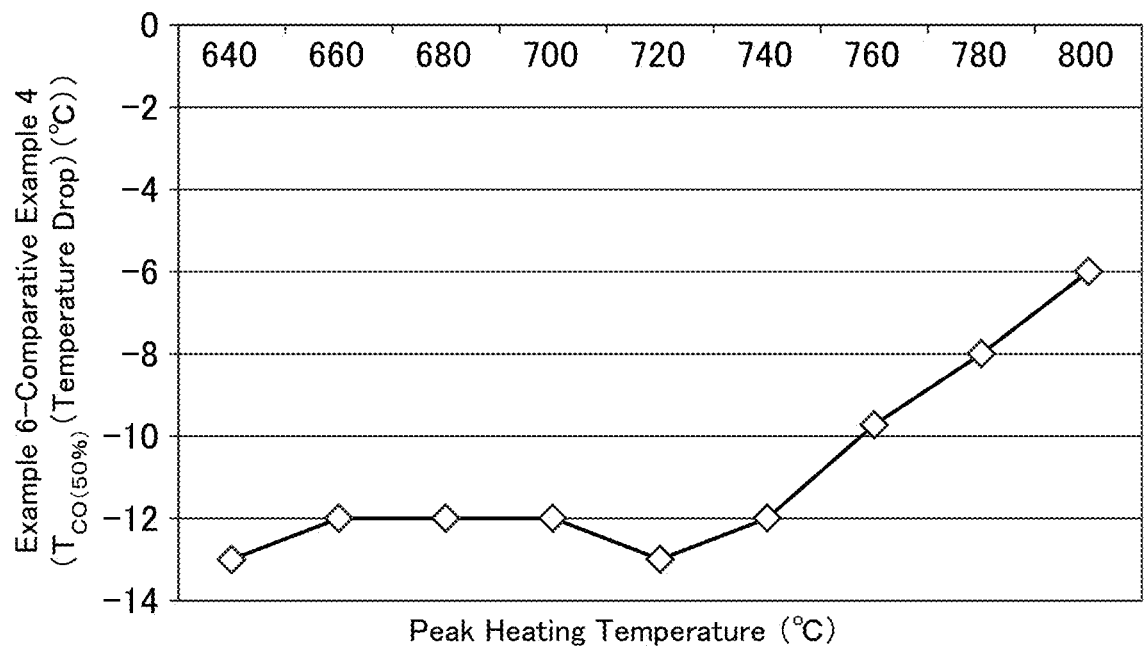
FIG. 8B is a graph illustrating the carbon monoxide purification performance in the temperature dropping process with respect to the rhodium-supported catalysts of Reference Example 6 and Reference Comparative Example 4.

The evaluation results in the temperature rising process and the temperature dropping process are illustrated respectively in FIGS. 8A and 8B as the difference between the result of Reference Example 6 and the result of Reference Comparative Example 4 (T$_{CO(50\%)}$ of Reference Example 6)-(T$_{CO(50\%)}$ of Reference Comparative Example 4). When the difference above takes a minus value, this indicates that T$_{CO(50\%)}$ of Reference Example 6 is lower than T$_{CO(50\%)}$ of Reference Comparative Example 4, i.e., the low-temperature activity of the catalyst of Reference Example 6 is excellent. In FIG. 8, the abscissa indicates the temperature (the peak temperature in FIG. 5) at which an accelerated deterioration treatment was performed.

It is understood from FIGS. 8A and 8B that the catalyst (Rh$_{cluster}$/MFI) of Reference Example 6 in which rhodium clusters are supported on a ZSM-5 zeolite carrier particles (MFI) has a significantly excellent low-temperature activity at all peak heating temperatures, compared with the catalyst (Rh$_{particle}$/MFI) of Reference Comparative Example 4 in which a rhodium cluster aggregate particles are supported on a ZSM-5 zeolite carrier particles (MFI).

Although not to be bound by theory, this is considered to be attributable to the fact that since the particle diameter of the rhodium cluster used in the catalyst of Reference Example 6 is significantly smaller than the particle diameter of the rhodium cluster aggregate particle used in the catalyst of Reference Comparative Example 4, a low-temperature catalytic activity specific to clusters was exhibited and a relatively large surface area could be provided for the catalytic reaction.

Reference Examples 7 to 10

In Reference Examples 7 to 10, a catalyst was obtained by supporting a rhodium cluster on zeolite carrier particles, and the obtained catalysts were evaluated for the durability.

Specifically, Reference Examples 7 to 10 were conducted as follows.

In Reference Examples 7 to 10, rhodium clusters were supported on zeolite carrier particles in the same manner as in Reference Example 1 except that a rhodium target was used in place of the gold target and the following carrier particles were used as the zeolite carrier particle.

Reference Example 7: ZSM-5 zeolite carrier particles (MFI) (Si/Al ratio: 1,500)

Reference Example 8: beta-type zeolite carrier particles (BEA) (Si/Al ratio: 1,500)

Reference Example 9: beta-type zeolite carrier particles (BEA) (Si/Al ratio: 40)

Reference Example 10: ZSM-5 zeolite carrier particles (MFI) (Si/Al ratio: 40)

With respect to the obtained rhodium cluster-supporting catalysts of Reference Examples 7 to 10, the temperature (T$_{CO(50\%)}$) when consuming 50% of the supplied carbon monoxide was evaluated in the temperature rising process and in the temperature dropping process in the same manner as in Reference Example 4.

<Evaluation: Durability>

Figure 9A:
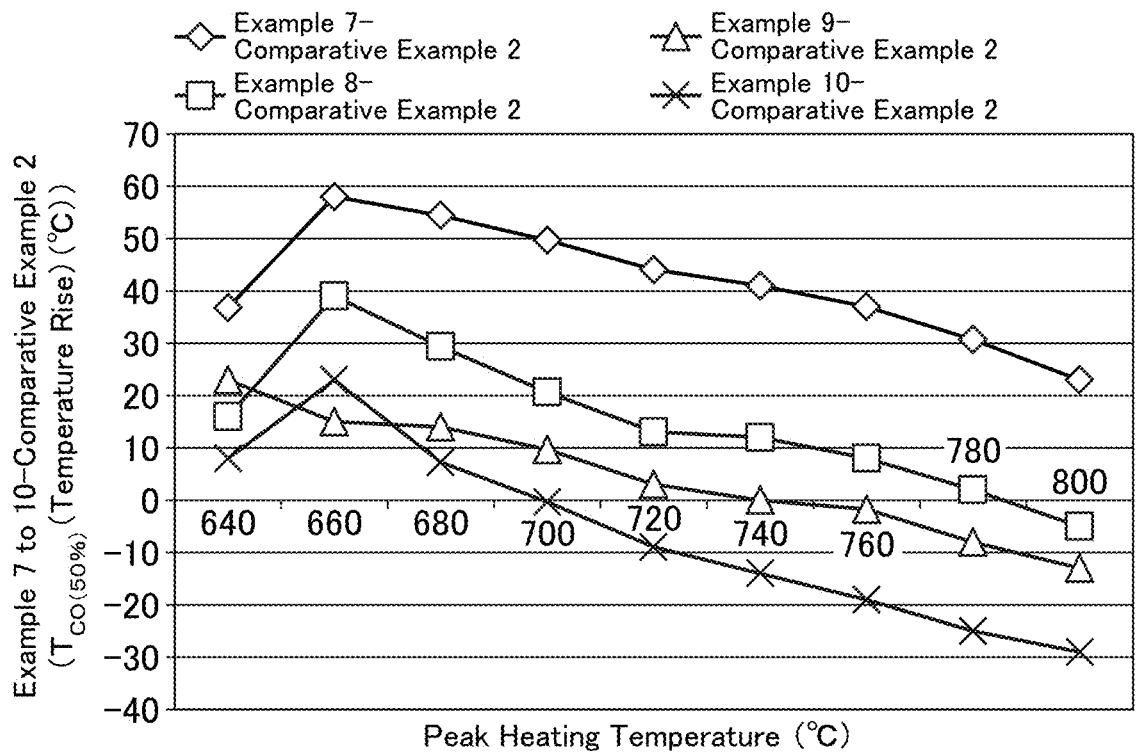
FIG. 9A is a graph illustrating the carbon monoxide purification performance in the temperature rising process with respect to the rhodium cluster-supporting catalysts of Reference Examples 7 to 10.
Figure 9B:
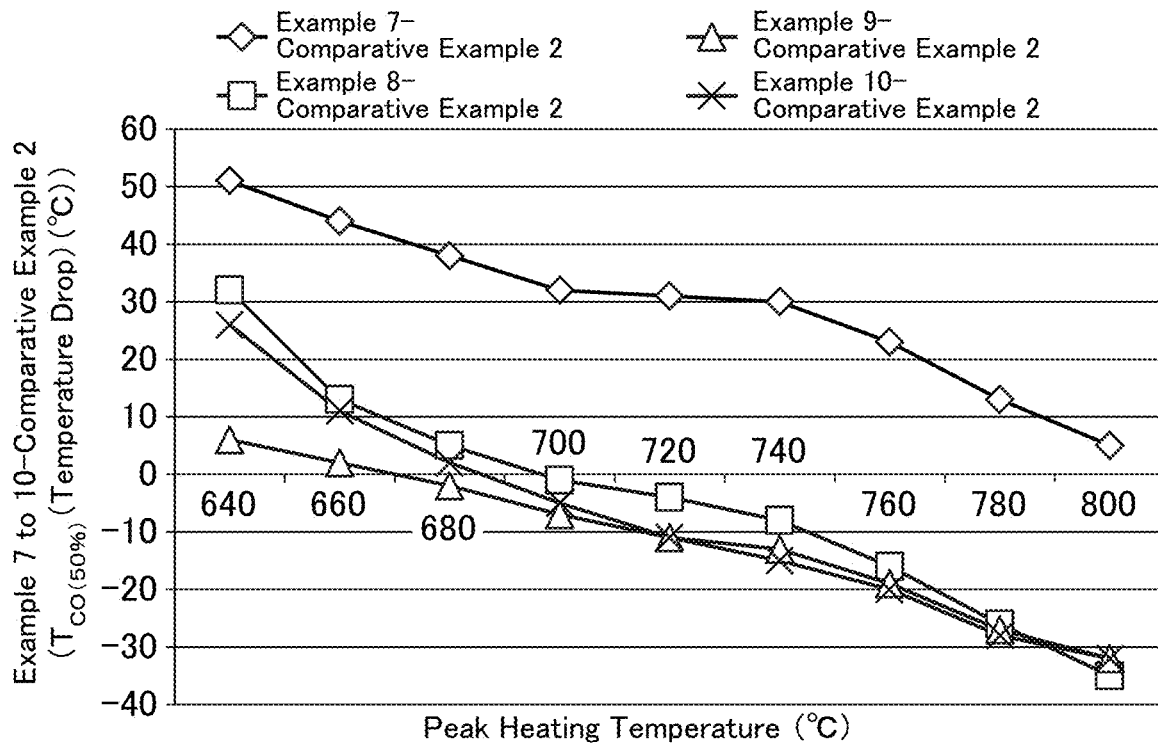
FIG. 9B is a graph illustrating the carbon monoxide purification performance in the temperature dropping process with respect to the rhodium cluster-supporting catalysts of Reference Examples 7 to 10.

The evaluation results in the temperature rising process and the temperature dropping process are illustrated respectively in FIGS. 9A and 9B as the difference between the results of Reference Examples 7 to 10 and the result of Reference Comparative Example 2 (commercially available exhaust gas purification catalyst) (T$_{CO(50\%)}$ of Reference Examples 7 to 10)-(T$_{CO(50\%)}$ of Reference Comparative Example 2). When the difference above takes a minus value, this indicates that T$_{CO(50\%)}$ of Reference Examples 7 to 10 is lower than T$_{CO(50\%)}$ of Reference Comparative Example 2, i.e., the low-temperature activity of the catalysts of Reference Examples 7 to 10 is excellent. In FIG. 9, the abscissa indicates the temperature (the peak temperature in FIG. 5) at which an accelerated deterioration treatment was performed.

It is understood from FIGS. 9A and 9B that the catalysts of Reference Examples 7 to 10 provides an excellent or equivalent exhaust gas purification performance relative to the catalyst of Reference Comparative Example 2 as the peak heating temperature becomes higher. This indicates that the catalysts of Reference Examples 7 to 10 are less likely to deteriorate compared with the catalyst of Reference Comparative Example 2.

Although not to be bound by theory, this is considered to be attributable to the fact that in the catalyst of Reference Comparative Example 2, rhodium of various sizes ranging from the monoatomic level to the submicrometer level was supported on the carrier to randomly cause sintering of rhodium particles by heat at the peak heating temperature and the catalyst was thereby deteriorated, whereas in the catalysts of Reference Examples 7 to 10, rhodium clusters were stably maintained within the pores of zeolite and in turn, the catalyst was not deteriorated due to heat at the peak heating temperature.

Incidentally, the catalyst of Reference Example 7 showed a poor catalyst performance in the temperature range of up to 800° C. compared with the catalyst of Reference Comparative Example 2, but it is clearly understood from the curves of FIGS. 9A and 9B that when the accelerated deterioration treatment is further continued, the performance of the catalyst of Reference Example 7 surpasses the performance of the catalyst of Reference Comparative Example 2.

Reviewing Reference Examples 7 and 10 using a ZSM-5 zeolite carrier particles (MFI) as the carrier, the catalyst of Reference Example 10 using ZSM-5 zeolite carrier particles (MFI(40)) having an Si/Al ratio of 40 exhibited good catalyst performance, compared with the catalyst of Reference Example 7 using ZSM-5 zeolite carrier particles (MFI (1500)) having an Si/Al ratio of 1,500. This is considered to occur because the ZSM-5 zeolite carrier particles (MFI(40)) having an Si/Al ratio of 40 has a larger number of acid sites than the ZSM-5 zeolite carrier particles (MFI(1500)) having an Si/Al ratio of 1,500 and supporting of the rhodium cluster on the zeolite carrier particles was successfully performed by an electrostatic action.

Reviewing Reference Examples 8 and 9 using a beta-type zeolite as the carrier, similarly to the case of MFI zeolite, the catalyst of Reference Example 9 using a beta-type zeolite carrier particles (BEA(40)) having an Si/Al ratio of 40, i.e., a zeolite carrier particles having a relatively large number of acid sites exhibited good catalyst performance, compared with the catalyst of Reference Example 8 using beta-type zeolite carrier particles (BEA(1500)) having an Si/Al ratio of 1,500, i.e., zeolite carrier particles having a relatively small number of acid sites.

However, in the case of using beta-type zeolite carrier particles (BEA), the difference in the catalyst performance due to the different in the Si/Al ratio was not so large as in the case of using ZSM-5 zeolite carrier particles (MFI). This is considered to occur because the beta-type zeolite carrier particle (BEA) substantially has a large surface solid acid strength and the effect of the difference in the amount of acid sites was less likely to develop.

For reference, the zeta potential (indicator of solid acid strength) of the zeolite carrier particles used in Reference Examples 7 to 10 is as follows:

Reference Example 7: ZSM-5 zeolite carrier particle (MFI(1500)): −72.7 mV

Reference Example 8: beta-type zeolite carrier particle (BEA(1500)): −96.8 mV

Reference Example 9: beta-type zeolite carrier particle (BEA(40)): −117 mV

Reference Example 10: ZSM-5 zeolite carrier particle (MFI(40)): −87 mV

That is, it is considered that in the case of a beta-type zeolite carrier particle (BEA), despite a large Si/Al ratio, the zeolite potential was low and supporting of the rhodium cluster on the zeolite carrier particle was thereby successfully performed by an electrostatic action.

In order to confirm this understanding, a rhodium particle was supported on MFI(40) (zeta potential: −87 mV) and on MFI(1500) (zeta potential: −72.7 mV) by laser ablation in liquid, as a result, coloring of the carrier caused by the supporting of rhodium particle on the carrier particle occurred more prominently in MFI(40) than in MFI(1500).

It is understood from this result that in the case of MFI(40) having a relatively small zeta potential, i.e., relatively large acid strength, the rhodium particle was supported on the carrier particle in a relatively successful manner through an electrostatic interaction between the rhodium particle and acid sites of the carrier particle.

Reference Examples 11 and 12

In Reference Examples 11 and 12, a supported copper-cluster catalyst was obtained by a method of reduction in liquid, and the obtained catalysts were evaluated by means of fluorescence.

Reference Example 11

In Reference Example 11, a zeolite carrier particle was dispersed in 2-propanol to produce a zeolite carrier particle dispersion liquid, and copper(II) chloride as a copper ion source and sodium borohydride ($NaBH_4$) as a reducing agent were mixed with the dispersion liquid to synthesize a copper cluster in the dispersion liquid. The thus-synthesized copper cluster had a positive charge and was thereby electrically drawn to acid sites of the zeolite carrier particle and supported thereon.

Figure 10:
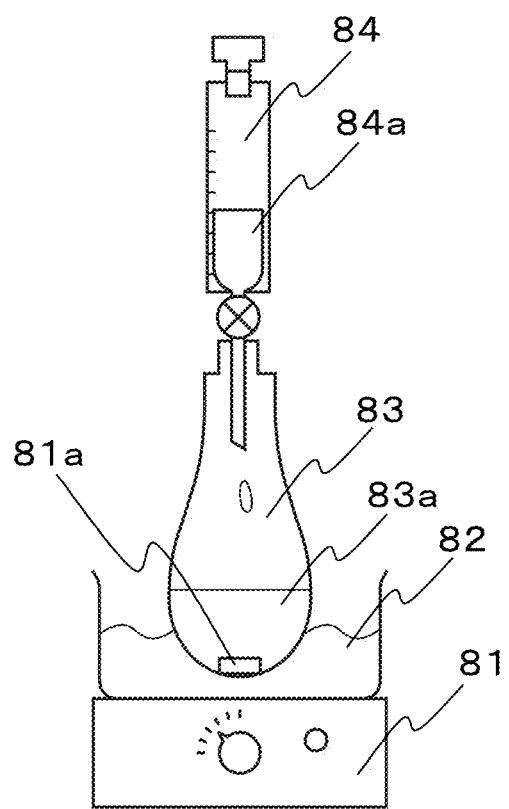
FIG. 10 is a diagrammatic view of the apparatus used in the preparation of clusters by a method of reduction in liquid.

Specifically, copper(II) chloride and sodium borohydride were mixed using the apparatus illustrated in FIG. 10.

More specifically, a water bath 82 at about 10° C. was disposed on a magnetic stirrer 81, a flask 83 was disposed thereon, a dropping funnel 84 was disposed on the flask 83, and the contents 84a of the dropping funnel 84 were added dropwise to the contents 83a of the flask 83 with stirring by means of a stirring bar 81a. The dropwise addition was performed for 1 hour while keeping the temperature by the water bath, and after the completion of dropwise addition, stirring was further performed for 1 hour while keeping the temperature by the water bath. Thereafter, stirring was further performed at room temperature for 2 hours, and the contents of the flask were then filtered and fired at a temperature of 300° C. for 2 hours in the atmosphere to obtain the supported copper-cluster catalyst of Reference Example 11.

The contents 84a of the dropping funnel 84 and the contents 83a of the flask 83 in Reference Example 11 are shown together in Table 1 below.

Reference Example 12

The supported copper-cluster catalyst of Reference Example 12 was obtained in the same manner as in Reference Example 11 except that the contents 84a of the dropping funnel 84 and the contents 83a of the flask 83 were changed as shown in Table 1 below.

TABLE 1

|  | Reference Example 11 |  | Reference Example 12 |  |
| --- | --- | --- | --- | --- |
| Dropping funnel | sodium borohydride | 25 μmol | copper chloride | 12 μmol |
|  | 2-propanol | 10 mL | 2-propanol | 5 mL |
| Flask | copper chloride | 12 μmol | sodium borohydride | 80 μmol |
|  | zeolite carrier particle | 200 mg | zeolite carrier particle | 200 mg |
|  | 2-propanol | 200 mL | 2-propanol | 200 mL |

<Evaluation: Fluorescence Spectrum>

The supported copper-cluster catalysts prepared in Reference Examples 11 and 12 and as reference samples, a copper ion-exchanged zeolite carrier particle and a proton-type zeolite carrier particle were measured for the fluorescence spectrum at an excitation wavelength of 350 nm. The results are illustrated in FIG. 11.

Figure 11:
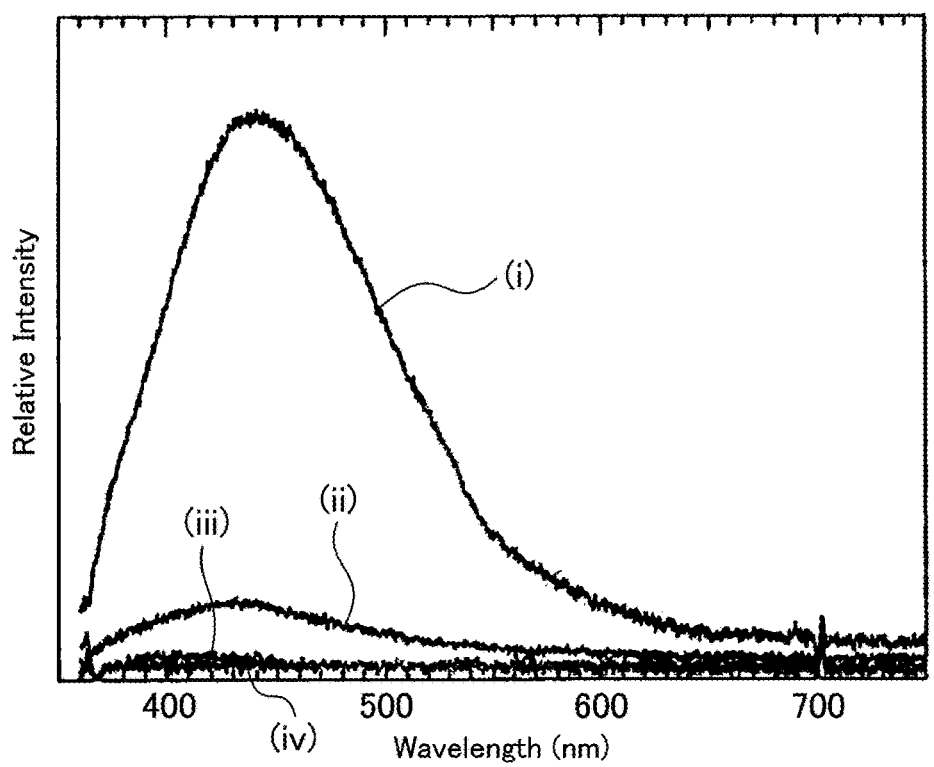
FIG. 11 is a graph illustrating the fluorescence spectra (excitation wavelength: 350 nm) with respect to samples prepared in Reference Examples 11 and 12 in which clusters are prepared by a method of reduction in liquid, and copper ion-exchanged zeolite carrier particles as a reference sample.

In FIG. 11, the result as to Reference Example 11 is indicated by the spectrum (i), the result as to Reference Example 12 is indicated by the spectrum (ii), the result as to the copper ion-exchanged zeolite carrier particle as a reference sample is indicated by the spectrum (iii), and the result as to the proton-type zeolite carrier particle as a reference sample is indicated by the spectrum (iv).

As understood from FIG. 11, the supported copper-cluster catalysts obtained in Reference Examples 11 and 12, particularly in Reference Example 11, showed a peak at about 440 nm. This peak is considered to be derived from the copper clusters. In the supported copper-cluster catalyst obtained in Reference Example 11, the peak above is as broad as having a half width of about 100 nm and is considered to be derived from the copper clusters.

<Evaluation: Fluorescence Spectrum>

In addition, the supported copper-cluster catalyst obtained in Reference Example 11 was measured for the fluorescence spectrum at an excitation wavelength of 350 nm and the excitation spectrum at a fluorescence monitor wavelength of 440 nm and 520 nm. The results are illustrated in FIG. 12.

Figure 12:
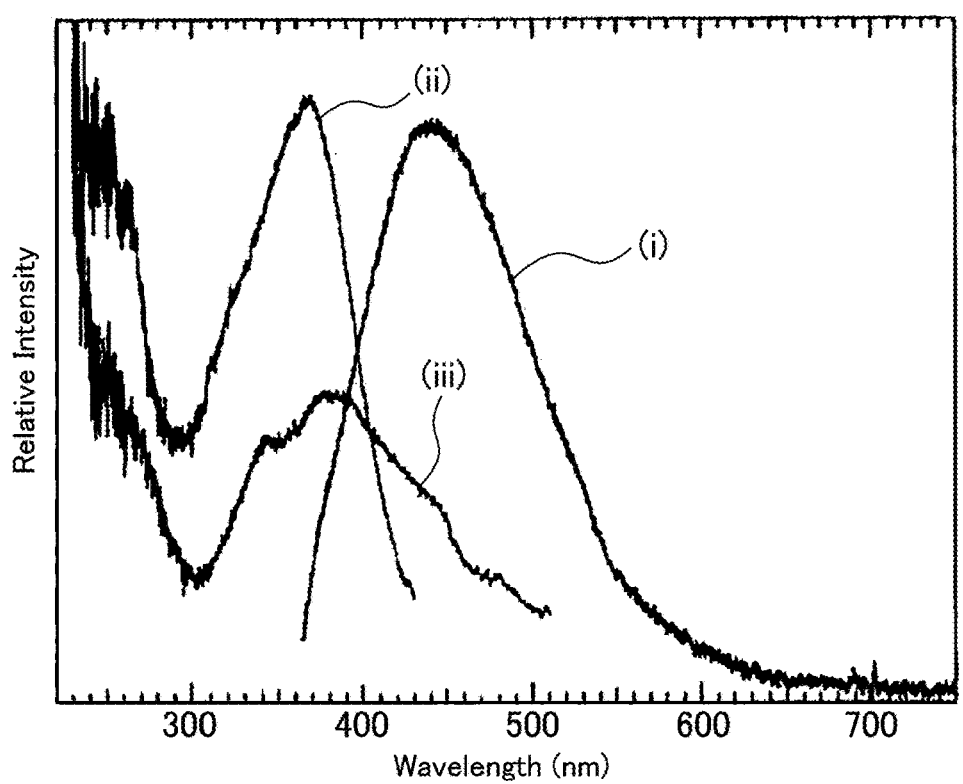
FIG. 12 is a graph illustrating the fluorescence spectrum (excitation wavelength: 350 nm) and the fluorescence spectra (fluorescence monitor wavelength: 440 nm, 520 nm) with respect to Reference Example 11 in which clusters are prepared by a method of reduction in liquid.

In FIG. 12, the result as to the excitation wavelength of 350 nm is indicated by the fluorescence spectrum (i), the result as to the fluorescence monitor wavelength of 440 nm is indicated by the spectrum (ii), and the result as to the fluorescence monitor wavelength of 520 nm is indicated by the spectrum (iii).

In FIG. 12, fluorescence specific to the copper clusters are observed, and it is therefore understood that the copper clusters are supported on the carrier particle.

Reference Example 13 and Reference Comparative Example 5

In Reference Example 13 and Reference Comparative Example 5, rhodium cluster-supporting catalysts were obtained by using a method of laser ablation in liquid and an ion exchange-reduction method, respectively.

Reference Example 13

In Reference Example 13, rhodium clusters were supported on a zeolite carrier particle by a method of laser ablation in liquid in the same manner as in Reference Example 1 except that a rhodium target was used in place of the gold target and ZSM-5 zeolite carrier particles (Si/Al ratio: 40) were used as the zeolite carrier particle.

Reference Comparative Example 5

In Reference Comparative Example 5, a rhodium ion was supported on ZSM-5 zeolite carrier particles (Si/Al ratio: 40) by ion exchange, and then a metallic rhodium particle was supported on the zeolite carrier particle by reducing the rhodium ion, whereby rhodium clusters were supported on the zeolite carrier particle (ion exchange-reduction method). $Rh(NO_3)_3$ was used as a rhodium ion source and $NaBH_4$ was used as a reducing agent.

<Evaluation: Fluorescence Spectrum>

The supported catalysts of Reference Example 13 and Reference Comparative Example 5 were measured for the fluorescence spectrum (excitation wavelength: 350 nm). The evaluation results of fluorescence spectrum normalized to the intensity per 1 mg of rhodium are illustrated in FIG. 13.

Figure 13:
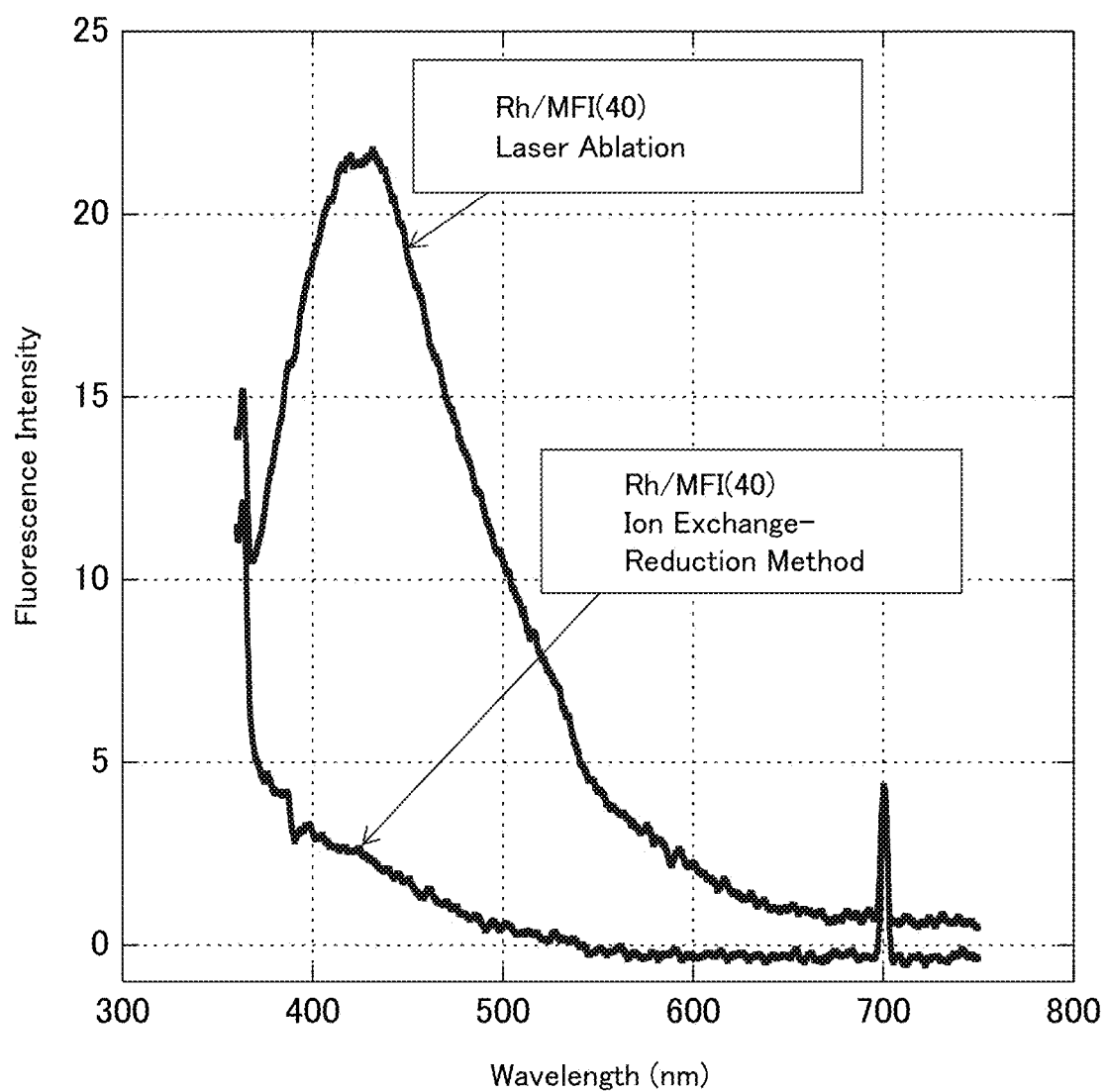
FIG. 13 is a graph illustrating the fluorescence spectra of the rhodium cluster-supporting catalysts of Reference Example 13 and Reference Comparative Example 5 prepared by a method of laser ablation in liquid and an ion exchange-reduction method, respectively.

It is understood from FIG. 13 that compared with Reference Comparative Example 5 using an ion exchange-reduction method, in Reference Example 13 using laser ablation in liquid, the fluorescence peak is large, i.e., a relatively large number of rhodium particles are supported in the cluster state on the zeolite carrier particle.

Reference Example 14 and Reference Comparative Example 6

In Reference Example 14 and Reference Comparative Example 6, supported gold-cluster catalysts were obtained by using a method of laser ablation in liquid and an ion exchange-reduction method, respectively.

Reference Example 14

In Reference Example 14, gold clusters were supported on a zeolite carrier particle by a method of laser ablation in liquid in the same manner as in Reference Example 1 except that ZSM-5 zeolite carrier particles (MFI) (Si/Al ratio: 1,500) were used as the zeolite carrier particle.

Reference Comparative Example 6

In Reference Comparative Example 6, a gold ion was supported on ZSM-5 zeolite carrier particles (MFI) (Si/Al ratio: 1,500) by ion exchange, and then gold clusters were supported on the zeolite carrier particle by reducing the gold ion (ion exchange-reduction method). Chloroauric acid $(HAuCl_4)$ was used as a gold ion source and $NaBH_4$ was used as a reducing agent.

<Evaluation: Overall Composition Evaluation (ICP-OES)>

With respect to the supported catalysts of Reference Example 14 and Reference Comparative Example 6, the elemental composition of the supported catalyst as a whole was evaluated using inductively coupled plasma spectrometer (ICP-OES apparatus) (Agilent 5100 manufactured by Agilent Technologies, Inc. and SPS3000 manufactured by Hitachi High-Tech Science Corporation). The results are shown in Table 2 below.

<Evaluation: Surface Composition Evaluation (TEM-EDX)>

With respect to the supported catalysts of Reference Example 14 and Reference Comparative Example 6, the elemental composition of the supported catalyst surface was evaluated using a transmission electron microscope-energy dispersive X-ray spectroscopy (TEM-EDX) (JEM-2100F and JED-2300, manufactured by JEOL Ltd.). The results are shown in Table 2 below.

TABLE 2

| | | Reference Example 14 (Au laser ablation/ MFI(1500)) | Comparative Reference Example 6 (Au ion change-reduction/ MFI(1500)) |
|---|---|---|---|
| Whole (ICP-MASS) | Au (wt %) | 0.015 | 0.005 |
| | Si (wt %) | 38 | 41 |
| | Au/Si | $3.95 \times 10^{-4}$ | $1.22 \times 10^{-4}$ |
| Surface (TEM-EDX) | Au (wt %) | 0.46 | 0.44 |
| | Si (wt %) | 66.94 | 59.82 |
| | Au/Si | $6.87 \times 10^{-3}$ | $7.36 \times 10^{-3}$ |

TABLE 2-continued

| | | Reference Example 14 (Au laser ablation/ MFI(1500)) | Comparative Reference Example 6 (Au ion change-reduction/ MFI(1500)) |
|---|---|---|---|
| Heterogeneity index | (Au/Si (surface))/ (Au/Si (whole)) | 17.39 | 60.33 |

It is understood from Table 2 that in the supported catalyst of Reference Example 14 obtained by the method of laser ablation in liquid, compared with the supported catalyst of Reference Comparative Example 6 obtained by the ion exchange-reduction method, the ratio of the proportion of gold element in the whole to the proportion of gold element in the surface is small, i.e., the gold clusters are relatively uniformly dispersed in the supported catalyst.

Reference Example 15 and Reference Comparative Example 7

In Reference Example 15 and Reference Comparative Example 7, rhodium cluster-supporting catalysts were obtained by using a method of laser ablation in liquid and an ion exchange-reduction method, respectively.

Reference Example 15

In Reference Example 15, rhodium clusters were supported on a zeolite carrier particle by a method of laser ablation in liquid in the same manner as in Reference Example 1 except that a rhodium target was used in place of the gold target and ZSM-5 zeolite carrier particles (Si/Al ratio: 40) were used as the zeolite carrier particle. The amount of rhodium supported was 0.1 mass % relative to the zeolite carrier particle.

Reference Comparative Example 7

In Reference Comparative Example 7, a rhodium ion was supported on ZSM-5 zeolite carrier particles (Si/Al ratio: 40) by ion exchange, and then a metallic rhodium particle was supported on the zeolite carrier particle by reducing the rhodium ion, whereby rhodium clusters were supported on the zeolite carrier particle (ion exchange-reduction method). $Rh(NO_3)_3$ was used as a rhodium ion source and $NaBH_4$ was used as a reducing agent. The amount of rhodium supported was 0.051 mass % relative to the zeolite carrier particle.

<Evaluation: $H_2$-TPR Test (Before Thermal Endurance)>

With respect to the supported catalysts of Reference Example 15 and Reference Comparative Example 7, a pretreatment was performed by adsorbing oxygen to the supported catalyst at 30° C. for 1 hour in a 100 vol % oxygen atmosphere and removing excess oxygen at 500° C. for 1 hour in a helium atmosphere.

With respect to the supported catalysts above subjected to the pretreatment, a test by hydrogen temperature-programmed reduction method ($H_2$-TPR) was performed by flowing a reducing gas containing 0.5 vol % of hydrogen and the balance helium at a spatial velocity of 10,000 $h^{-1}$ while raising the temperature at a rate of 10° C./min from 20° C.

Figure 14A:
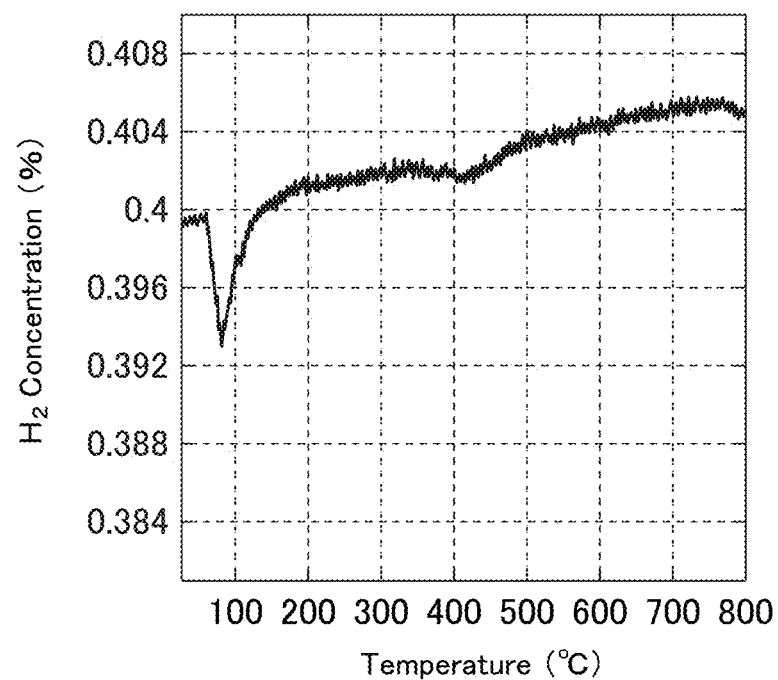
FIG. 14A is a graph illustrating the results of a test by hydrogen temperature-programmed reduction method ($H_2$-TPR) with respect to the rhodium cluster-supporting catalyst of Reference Example 15 prepared by a method of laser ablation in liquid.
Figure 15A:
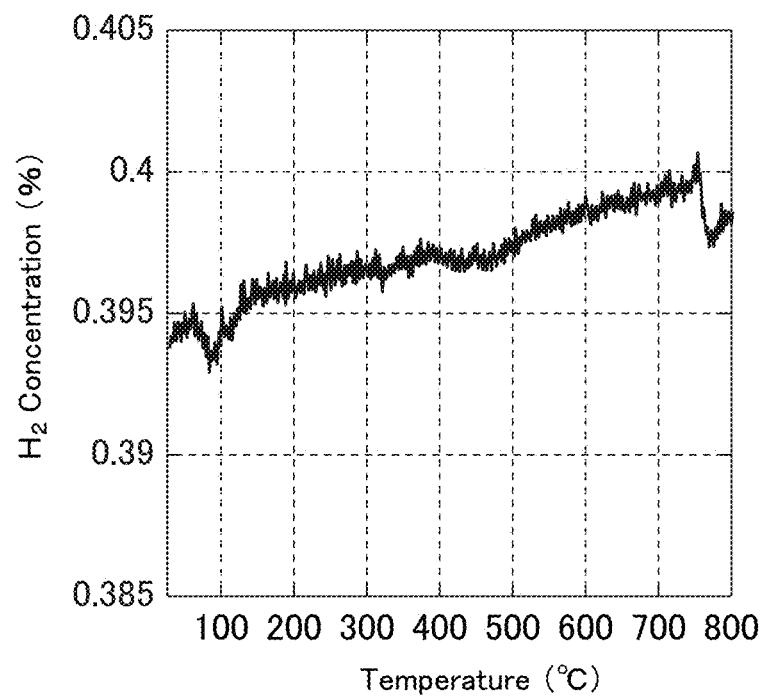
FIG. 15A is a graph illustrating the results of a $H_2$-TPR test before thermal endurance with respect to the rhodium cluster-supporting catalyst of Reference Comparative Example 7 prepared by an ion exchange-reduction method.

The result as to the supported catalyst of Reference Example 15 is illustrated in FIG. 14A, and the result as to the supported catalyst of Reference Comparative Example 7 is illustrated in FIG. 15A. The peak/noise ratio of the peak of FIG. 14A was 35.7 (noise level: 0.000215%), and the peak/noise ratio of the peak of FIG. 15A was 5.12 (noise level: 0.000394%).

It is understood from these graphs that both of the supported catalysts of Reference Example 15 and Reference Comparative Example 7 have a relatively large peak of reaction between hydrogen supplied and oxygen adsorbed to the cluster-supporting catalyst, i.e., a peak with a peak/noise ratio of 2.0 or more, in the temperature range of 150° C. or less, i.e., have low-temperature activity.

<Evaluation: $H_2$-TPR Test (after Thermal Endurance)>

With respect to the supported catalysts of Reference Example 15 and Reference Comparative Example 7, a thermal endurance treatment was performed by subjecting the supported catalyst to heating for 2 hours in an atmosphere at 800° C. containing 20 vol % of oxygen and the balance helium and then to heating for 1 hour in an atmosphere at 800° C. containing 0.5 vol % of hydrogen and the balance helium.

With respect to the supported catalysts above subjected to the thermal endurance treatment, a pretreatment was performed as described above.

With respect to the supported catalysts above subjected to the pretreatment, a $H_2$-TPR test was performed as described above.

Figure 14B:
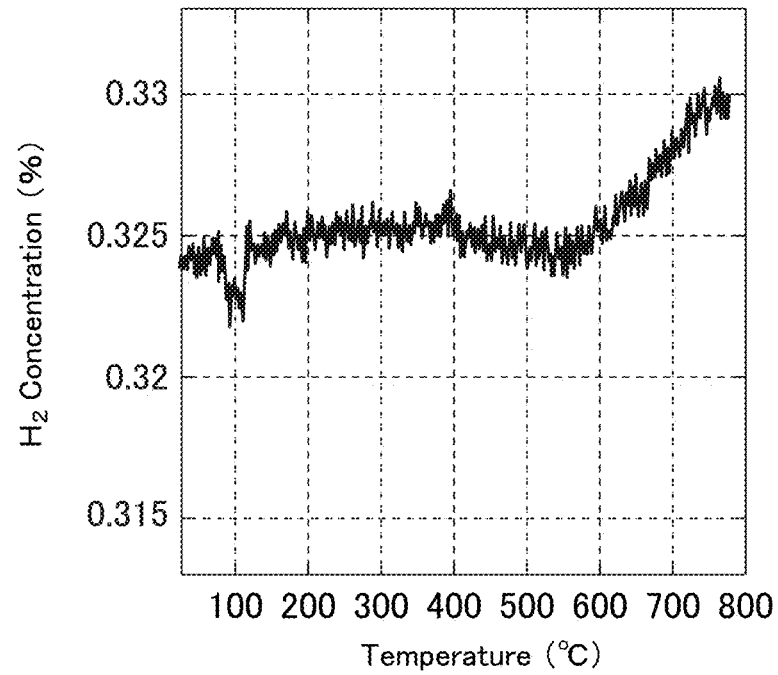
FIG. 14B is a graph illustrating the results of a test by hydrogen temperature-programmed reduction method ($H_2$-TPR) with respect to the rhodium cluster-supporting catalyst of Reference Example 15 prepared by a method of laser ablation in liquid.
Figure 15B:
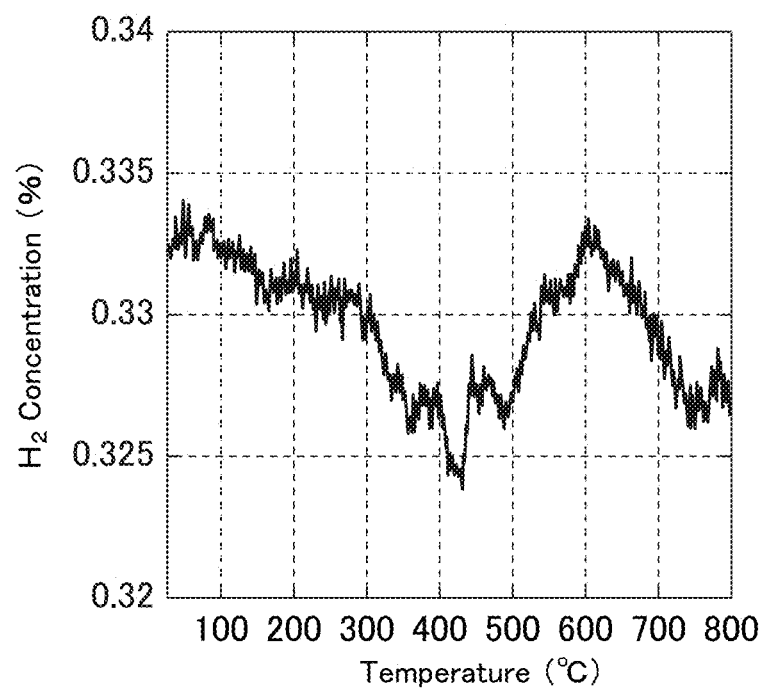
FIG. 15B is a graph illustrating the results of a $H_2$-TPR test after thermal endurance with respect to the rhodium cluster-supporting catalyst of Reference Comparative Example 7 prepared by an ion exchange-reduction method.

The result as to the supported catalyst of Reference Example 15 is illustrated in FIG. 14B, and the result as to the supported catalyst of Reference Comparative Example 7 is illustrated in FIG. 15B. The peak/noise ratio of the peak of FIG. 14B was 7.76 (noise level: 0.000326%), and the peak/noise ratio of the peak of FIG. 15B was 1.62 (noise level: 0.000377%).

It is understood from FIG. 14B that the supported catalyst of Reference Example 15 has a relatively large reaction peak in the temperature range of 150° C. or less, i.e., has low-temperature activity. In addition, it is understood from FIG. 15B that the supported catalyst of Reference Comparative Example 7 does not have a substantial peak in the temperature range of 150° C. or less, i.e., does not have a peak with a peak/noise ratio of 2.0 or more. In this way, the supported catalyst of Reference Comparative Example 7 does not have a substantial peak in the temperature range of 150° C. or less, and this means that the supported catalyst does not have low-temperature activity. That is, it is understood that in the supported catalyst of Reference Comparative Example 7 obtained by the ion exchange-reduction method, the dispersibility of the cluster particle was low and in turn, the heat resistance was poor.

Reference Example 16 and Reference Comparative Example 8

In Reference Example 16 and Reference Comparative Example 8, palladium cluster-supporting catalysts were obtained by using a method of laser ablation in liquid and an ion exchange-reduction method, respectively.

Reference Example 16

In Reference Example 16, palladium clusters were supported on a zeolite carrier particle by a method of laser ablation in liquid in the same manner as in Reference Example 1 except that a palladium target was used in place of the gold target and ZSM-5 zeolite carrier particles (Si/Al ratio: 40) were used as the zeolite carrier particle. The amount of palladium supported was 0.09 mass % relative to the zeolite carrier particle.

Reference Comparative Example 8

In Reference Comparative Example 8, a palladium ion was supported on ZSM-5 zeolite carrier particles (Si/Al ratio: 40) by ion exchange, and then a metallic palladium particle was supported on the zeolite carrier particle by reducing the palladium ion, whereby palladium clusters were supported on the zeolite carrier particle (ion exchange-reduction method). $Pd(NH_3)_4Cl_2 \cdot H_2O$ (tetraamminepalladium(II) chloride monohydrate) was used as a palladium ion source and $NaBH_4$ was used as a reducing agent. The amount of palladium supported was 0.86 mass % relative to the zeolite carrier particle.

<Evaluation: Carbon Monoxide Oxidation Test>

With respect to the supported catalysts of Reference Example 16 and Reference Comparative Example 8, a thermal endurance treatment was performed by subjecting the supported catalyst to heating for 2 hours in an atmosphere at 800° C. containing 20 vol % of oxygen and the balance helium and then to heating for 1 hour in an atmosphere at 800° C. containing 0.5 vol % of hydrogen and the balance helium.

A model gas containing 0.3 vol % of carbon monoxide, 8.0 vol % of oxygen and the balance helium was flowed at a spatial velocity of 10,000 $h^{-1}$ over the supported catalysts subjected to the thermal endurance treatment, and the number of molecules of the carbon monoxide molecule capable of being oxidized to carbon dioxide molecule by one palladium atom at a temperature of 100° C. in the temperature dropping process was evaluated by performing a temperature rising process of raising the temperature at a rate of 10° C./min to 800° C. from room temperature and then performing a temperature dropping process of lowering the temperature to room temperature.

The number of molecules can be obtained by dividing the molar number of the carbon dioxide molecule in the model gas flowing per second after reaction by the molar number of palladium as a catalyst metal in the supported catalyst.

Figure 16:
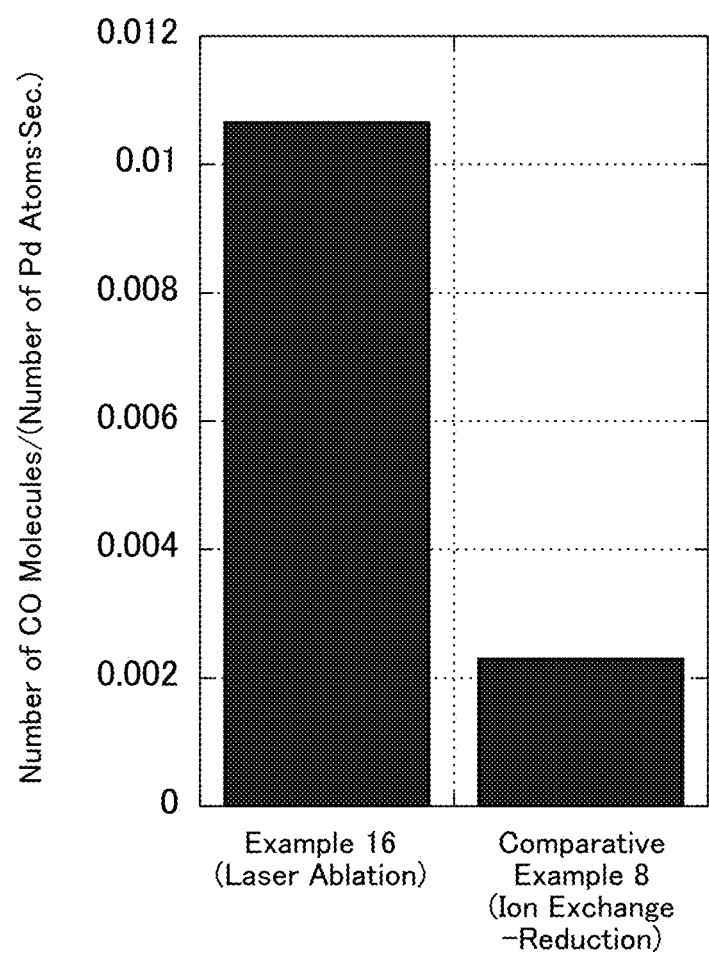
FIG. 16 is a graph illustrating the results of a carbon monoxide oxidation test with respect to the palladium cluster-supporting catalysts of Reference Example 16 prepared by a method of laser ablation in liquid and Reference Comparative Example 8 prepared by an ion exchange-reduction method.

The results as to the supported catalysts of Reference Example 16 and Reference Comparative Example 8 are illustrated in FIG. 16. It is seen from FIG. 16 that in the supported catalyst of Reference Example 16 obtained by the laser ablation method, the number of molecules of the carbon monoxide molecule capable of being oxidized to carbon dioxide molecule by one palladium atom was near 0.008 and on the other hand, in the supported catalyst of Reference Comparative Example 8 obtained by the ion exchange-reduction method, the number did not reach 0.002. This indicates that in the supported catalyst of Reference Comparative Example 8 obtained by the ion exchange-reduction method, the dispersibility of the cluster particle was low and in turn, the heat resistance was poor.

Reference Example 17 and Reference Comparative Example 9

In Reference Example 17 and Reference Comparative Example 9, platinum cluster-supporting catalysts were obtained by using a method of laser ablation in liquid and an ion exchange-reduction method, respectively.

Reference Example 17

In Reference Example 17, platinum clusters were supported on a zeolite carrier particle by a method of laser ablation in liquid in the same manner as in Reference Example 1 except that a platinum target was used in place of the gold target and ZSM-5 zeolite carrier particles (Si/Al ratio: 40) were used as the zeolite carrier particle. The amount of platinum supported was 1.1 mass % relative to the zeolite carrier particle.

Reference Comparative Example 9

In Reference Comparative Example 9, a platinum ion was supported on ZSM-5 zeolite carrier particles (Si/Al ratio: 40) by ion exchange, and then a metallic platinum particle was supported on the zeolite carrier particle by reducing the platinum ion, whereby platinum clusters were supported on the zeolite carrier particle (ion exchange-reduction method). $Pt(NH_3)_4Cl_2 \cdot xH_2O$ (tetraammineplatinum(II) chloride monohydrate) was used as a platinum ion source and $NaBH_4$ was used as a reducing agent. The amount of platinum supported was 1.9 mass % relative to the zeolite carrier particle.

<Evaluation: Carbon Monoxide Oxidation Test>

With respect to the supported catalysts of Reference Example 17 and Reference Comparative Example 9, a thermal endurance treatment was performed by subjecting the supported catalyst to heating for 2 hours in an atmosphere at 800° C. containing 20 vol % of oxygen and the balance helium and then to heating for 1 hour in an atmosphere at 800° C. containing 0.5 vol % of hydrogen and the balance helium.

A model gas containing 0.3 vol % of carbon monoxide, 8.0 vol % of oxygen and the balance helium was flowed at a spatial velocity of 10,000 $h^{-1}$ over the supported catalysts subjected to the thermal endurance treatment, and the number of molecules of the carbon monoxide molecule capable of being oxidized to carbon dioxide molecule by one platinum atom at a temperature of 60° C. in the temperature dropping process was evaluated by performing a temperature rising process of raising the temperature at a rate of 10° C./min to 800° C. from room temperature and then performing a temperature dropping process of lowering the temperature to room temperature.

Figure 17:
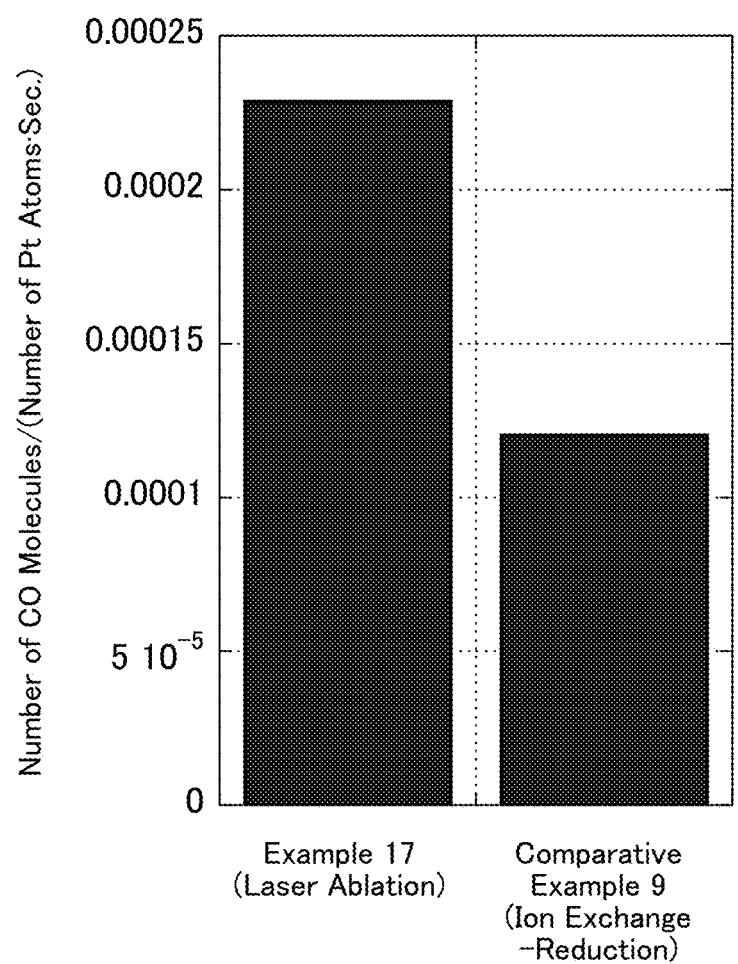
FIG. 17 is a graph illustrating the results of a carbon monoxide oxidation test with respect to the platinum cluster-supporting catalysts of Reference Example 17 prepared by a method of laser ablation in liquid and Reference Comparative Example 9 prepared by an ion exchange-reduction method.

The results as to the supported catalysts of Reference Example 17 and Reference Comparative Example 9 are illustrated in FIG. 17. It is seen from FIG. 17 that in the supported catalyst of Reference Example 17 obtained by the laser ablation method, the number of molecules of the carbon monoxide molecule capable of being oxidized to carbon dioxide molecule by one platinum atom was near 0.0002 and on the other hand, in the supported catalyst of Reference Comparative Example 9 obtained by the ion exchange-reduction method, the number did not reach 0.0001. This indicates that in the supported catalyst of Reference Comparative Example 9 obtained by the ion exchange-reduction method, the dispersibility of the cluster particle was low and in turn, the heat resistance was poor.

Reference Example 18 and Reference Comparative Example 10

In Reference Example 18 and Reference Comparative Example 10, supported copper-cluster catalysts were obtained by using a method of laser ablation in liquid and an ion exchange-reduction method, respectively.

Reference Example 18

In Reference Example 18, copper clusters were supported on a zeolite carrier particle by a method of laser ablation in liquid in the same manner as in Reference Example 1 except that a copper target was used in place of the gold target and a chavazite (CHA)-type zeolite carrier particle were used as the zeolite carrier particle. The amount of copper supported was 0.9 mass % relative to the zeolite carrier particle.

Reference Comparative Example 10

In Reference Comparative Example 10, a copper ion was supported on a chavazite (CHA)-type zeolite carrier particle by ion exchange, and then a metallic copper particle was supported on the zeolite carrier particle by reducing the copper ion, whereby copper clusters were supported on the zeolite carrier particle (ion exchange-reduction method). Copper nitrate was used as a copper ion source and $NaBH_4$ was used as a reducing agent. The amount of copper supported was 0.9 mass % relative to the zeolite carrier particle.

<Evaluation: Nitric Oxide Temperature-Programmed Desorption Test>

With respect to the supported catalysts of Reference Example 18 and Reference Comparative Example 10, nitric oxide was adsorbed to the supported catalyst through heating at 800° C. for 1 hour in an atmosphere containing 10 vol % of oxygen and the balance helium, heating at 800° C. for 30 minutes in an atmosphere containing 100 vol % of helium, lowering of the ambient temperature to 25° C., holding for 1 hour in an atmosphere containing 500 ppm by volume of nitric oxide and the balance helium, and holding for 1 hour in an atmosphere containing 100 vol % of helium.

The supported catalyst having adsorbed thereto nitric oxide was heated at a temperature rise rate of 10° C./min to 800° C. in an atmosphere containing 100 vol % of helium, and the amount of nitric oxide desorbed during the heating was detected by a mass spectrometer to obtain a nitric oxide temperature-programmed desorption spectrum. Incidentally, the gas flow rate in the atmosphere was 10 sccm in all cases.

Figure 18A:
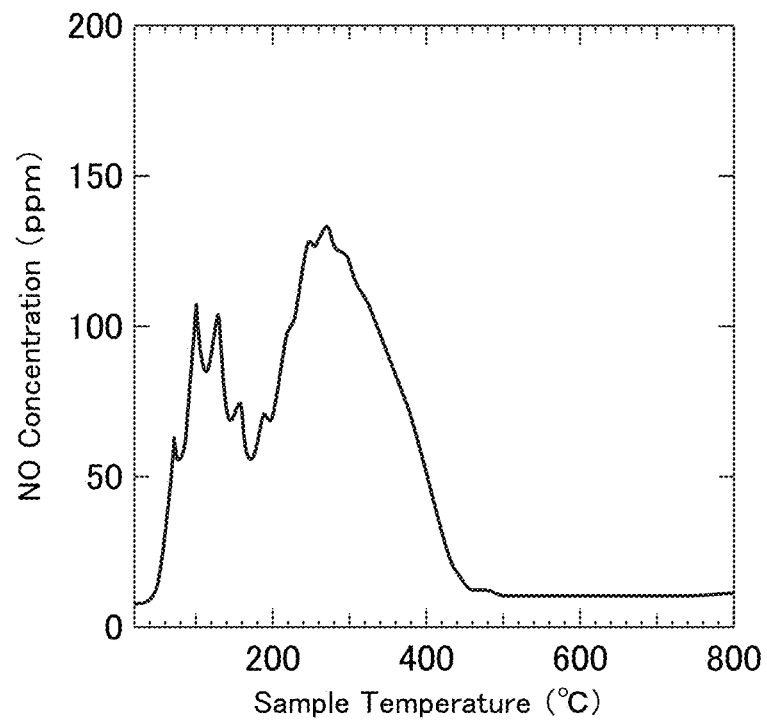
FIG. 18A is a graph illustrating the result of a nitric oxide temperature-programmed desorption test with respect to the supported copper-cluster catalyst of Reference Example 18 prepared by a method of laser ablation in liquid.
Figure 18B:
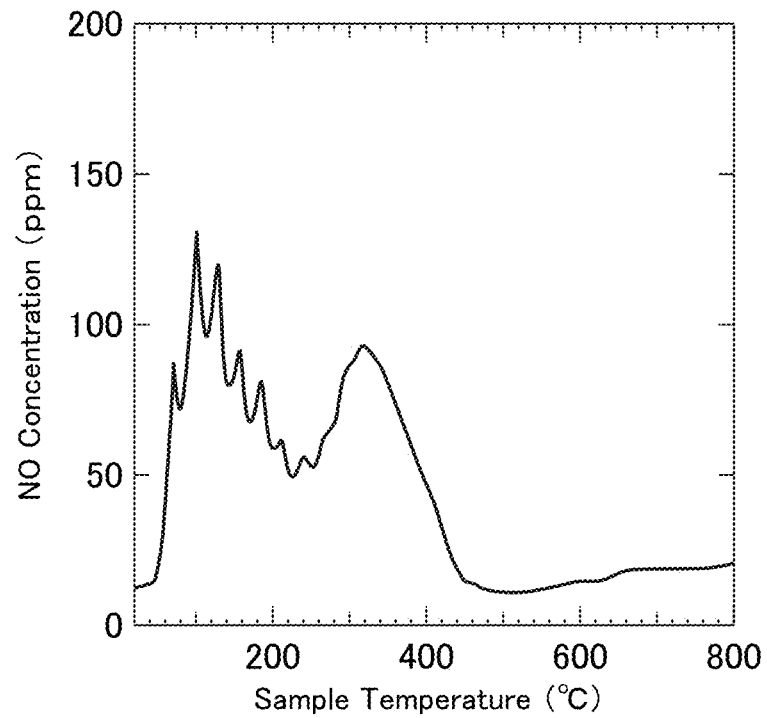
FIG. 18B is a graph illustrating the result of a nitric oxide temperature-programmed desorption test with respect to the supported copper-cluster catalyst of Reference Comparative Example 10 prepared by an ion exchange-reduction method.

The results as to the supported catalysts of Reference Example 18 and Reference Comparative Example 10 are illustrated in FIGS. 18A and 18B, respectively.

It is revealed from FIG. 18A that in the supported catalyst of Reference Example 18 obtained by the laser ablation method, the maximum peak in the range of 200 to 400° C. is present at about 270° C. On the other hand, it is revealed from FIG. 18B that in the supported catalyst of Reference Comparative Example 10 obtained by the ion exchange-reduction method, the maximum peak in the range of 200 to 400° C. is present at about 320° C. A sharp peak observed at a temperature of about 200° C. or less is thought of as a measurement error due to fluctuation of the measurement temperature.

The difference in the temperature between maximum peaks illustrated in FIGS. 18A and 18B indicates that the supported catalyst of Reference Example 18 obtained by the laser ablation method and the supported catalyst of Reference Comparative Example 10 obtained by the ion exchange-reduction method have different structures from each other.

Reference Example 19 and Reference Comparative Example 11

In Reference Example 19 and Reference Comparative Example 11, platinum cluster-supporting catalysts were obtained by using an positive-negative inversion method and an ion exchange-reduction method, respectively.

Reference Example 19

In Reference Example 19, zeolite MFI(40) was added to 200 ml of an aqueous solution containing 10 mM of $H_2[PtCl_6]$ in pure water, a pulsed laser is converged and introduced into this aqueous solution to decompose $H_2[PtCl_6]$ and produce a positively charged platinum cluster, and the positively charged platinum clusters were supported on the acid sites of zeolite through an electrostatic interaction.

Reference Comparative Example 11

In Reference Comparative Example 11, $H_2[PtCl_6]$ in pure water was supported on zeolite MFI(40) by ion exchange. The amount of platinum supported was 0.003 mass % relative to the zeolite carrier particle.

<Evaluation: Fluorescence Spectrum>

Figure 19:
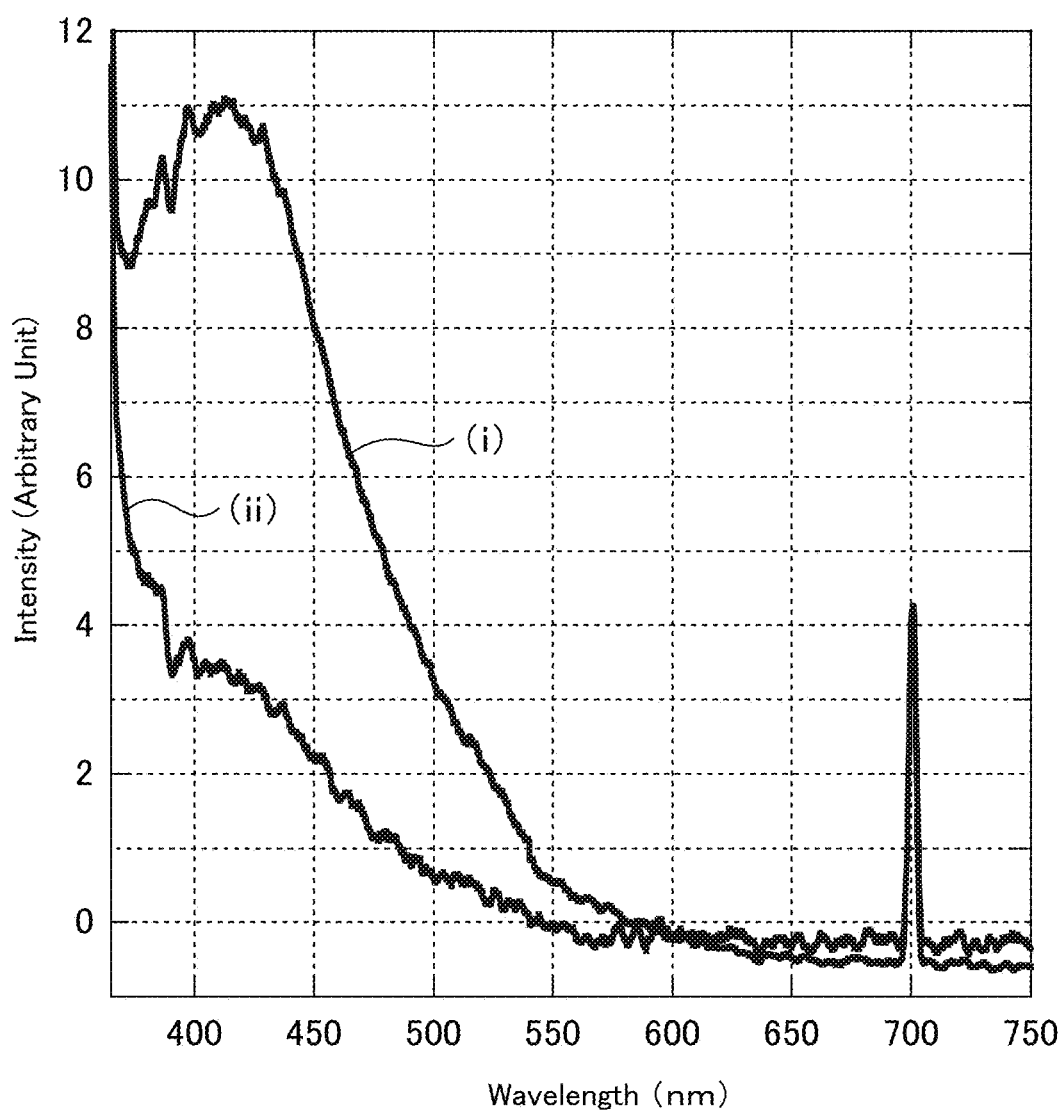
FIG. 19 is a graph illustrating the fluorescence spectra with respect to the platinum cluster-supporting catalysts of Reference Example 19 prepared by a positive-negative inversion method and Reference Comparative Example 11 prepared by an ion exchange-reduction method.

The platinum cluster-supporting catalysts of Reference Example 19 and Reference Comparative Example 11 were measured for the fluorescence spectrum (excitation wavelength: 350 nm). The evaluation results of fluorescence spectrum are illustrated in FIG. 19. In FIG. 19, the results as to Reference Example 18 is indicated by the spectrum (i), and the result as to Reference Comparative Example 11 is indicated by the spectrum (ii).

In FIG. 19, the fluorescence signal at near 410 nm is a spectrum in which fluorescent emissions from the gold cluster of about tetramer were overlapped. Accordingly, FIG. 19 reveals that in the platinum cluster-supporting catalyst of Reference Example 18, a relatively large amount of a platinum cluster around tetramer is supported on the carrier particle and on the other hand, in the supported-platinum catalyst of Reference Comparative Example 11, such clusters are not present in a significant manner.

Reference Example 20 and Reference Comparative Example 12

In Reference Example 20 and Reference Comparative Example 12, rhodium cluster-supporting catalysts were obtained by using a method of laser ablation in liquid and an ion exchange-reduction method, respectively.

Reference Example 20

In Reference Example 20, rhodium clusters were supported on a zeolite carrier particle by a method of laser ablation in liquid in the same manner as in Reference Example 1 except that a rhodium target was used in place of the gold target and ZSM-5 zeolite carrier particles (Si/Al ratio: 40) were used as the zeolite carrier particle. The amount of rhodium supported was 0.1 mass % relative to the zeolite carrier particle.

Reference Comparative Example 12

In Reference Comparative Example 12, a rhodium ion was supported on ZSM-5 zeolite carrier particles (Si/Al ratio: 40) by ion exchange, and then rhodium clusters were supported on the zeolite carrier particle by reducing the rhodium ion. $Rh(NO_3)_3$ was used as a rhodium ion source and $NaBH_4$ was used as a reducing agent. The amount of rhodium supported was 0.051 mass % relative to the zeolite carrier particle.

<Evaluation: Nitric Oxide Reduction Test>

A thermal endurance treatment was performed by heating the supported catalyst for 1 hour in an atmosphere at 800° C. containing 8 vol % of oxygen, 0.3 vol % of carbon monoxide and the balance helium.

A model gas containing 0.1 vol % of $^{15}NO$, 0.65 vol % of CO and the balance helium was flowed at a spatial velocity of 10,000 $h^{-1}$ over the supported catalysts subjected to the thermal endurance treatment, and the nitric oxide reduction reaction was measured by raising the temperature at a rate of 10° C./min to 800° C. from room temperature (temperature rising process) and then lowering the temperature to room temperature (temperature dropping process).

Figure 20A:
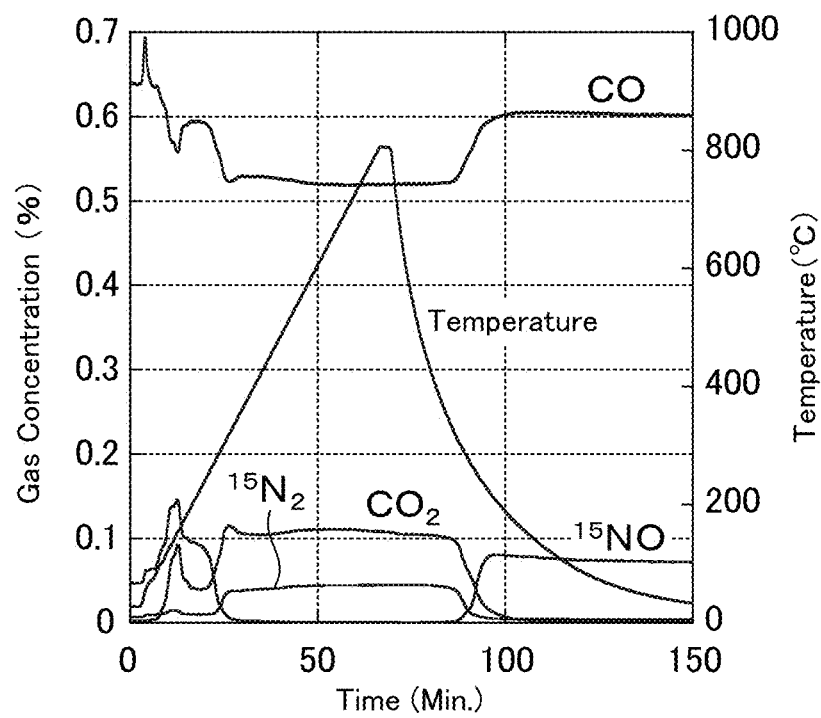
FIG. 20A is a graph illustrating the nitric oxide reduction test result (gas composition) with respect to the rhodium cluster-supporting catalyst of Reference Example 20 prepared by a method of laser ablation in liquid.
Figure 20B:
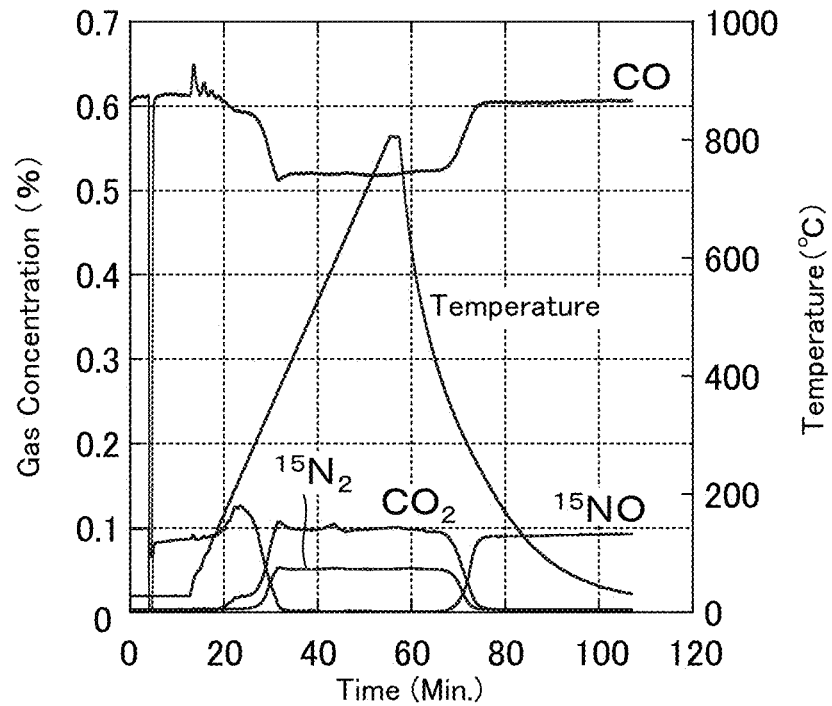
FIG. 20B is a graph illustrating the nitric oxide reduction test result (gas composition) with respect to the rhodium cluster-supporting catalyst of Reference Comparative Example 12 prepared by an ion exchange-reduction method.

With respect to the concentration change of each component due to the nitric oxide reduction, the evaluation result as to the catalyst of Reference Example 20 is illustrated in FIG. 20A, and the evaluation result as to the catalyst of Reference Comparative Example 12 is illustrated in FIG. 20B.

In FIGS. 20A and 20B, a peak of nitrogen oxide appears in the range of 100 to 200° C., and this is a concentration rise due to desorption of nitric oxide adsorbed to the catalyst. When the reaction temperature further rises, the concentration of nitric oxide decreases, and a reaction of reducing nitric oxide ($^{15}NO$) by carbon monoxide (CO) to produce nitrogen ($N_2$) starts.

In the catalyst of Reference Example 20, the reaction temperature at the time of half of the nitric oxide supplied being reduced into nitrogen, i.e., the reaction temperature at the time of the nitrogen concentration becoming 0.05 vol %, is about 272° C. in the temperature rising process and 254° C. in the temperature dropping process, whereas in the catalyst of Reference Comparative Example 12, the reaction temperature was about 321° C. in the temperature rising process and 279° C. in the temperature dropping process. It is therefore revealed that the catalyst of Reference Example 20 obtained by the method of laser ablation in liquid has excellent low-temperature activity, compared with the catalyst of Reference Comparative Example 12 obtained by the ion exchange-reduction method.

Figure 21:
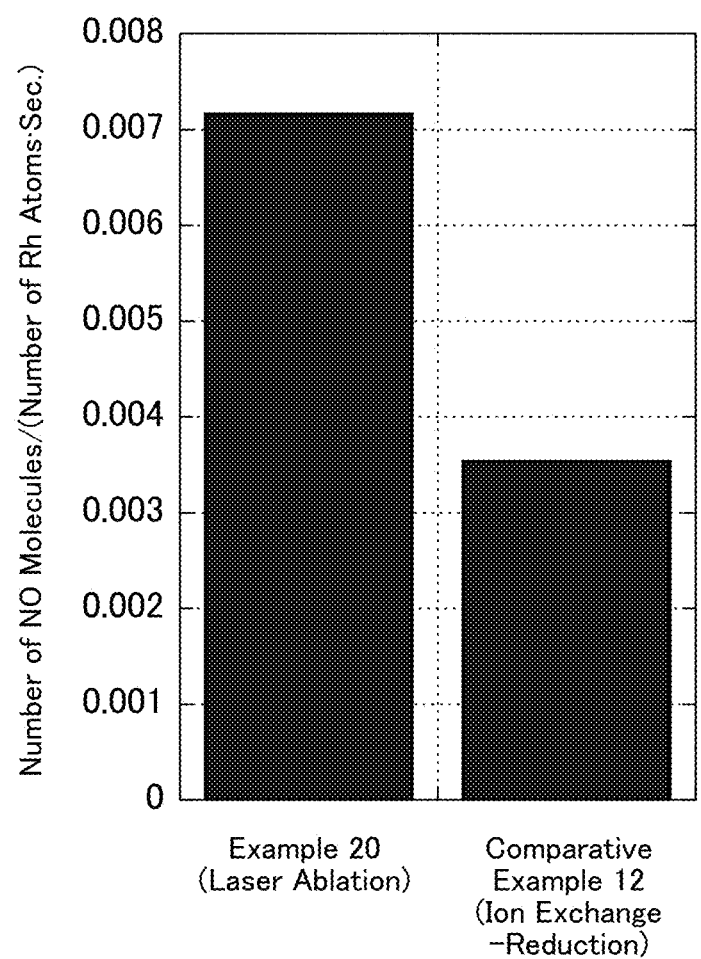
FIG. 21 is a graph illustrating the nitric oxide reduction test results with respect to the rhodium cluster-supporting catalysts of Reference Example 20 prepared by a method of laser ablation in liquid and Reference Comparative Example 12 prepared by an ion exchange-reduction method.

The evaluation results of the number of molecules of the nitric oxide molecule capable of being reduced to nitrogen by one rhodium atom at a temperature of 250° C. in the temperature dropping process are illustrated in FIG. 21.

FIG. 21 reveals that in the supported catalyst of Reference Example 20 obtained by the laser ablation method, the number of molecules of nitrogen monoxide molecule capable of being purified in 1 second by one rhodium atom exceeded 0.007 and on the other hand, in the catalyst of Reference Comparative Example 12 obtained by the ion exchange-reduction method, the number did not reach 0.004. It is therefore apparent that the catalyst of Reference Example 20 obtained by the laser ablation method has excellent low-temperature activity, compared with the catalyst of Reference Comparative Example 12 obtained by the ion exchange-reduction method.

Reference Examples 21 and 22 and Reference Comparative Example 13

In Reference Examples 21 and 22, a platinum cluster-supporting catalyst and a rhodium cluster-supporting catalyst were obtained respectively by using a method of laser ablation in liquid. In Reference Comparative Example 13, a general three-way catalyst in which platinum, rhodium and palladium are supported on a mixed powder of alumina carrier particles and ceria-zirconia carrier particles was used.

Reference Example 21

In Reference Example 21, platinum clusters were supported on a zeolite carrier particle by a method of laser ablation in liquid in the same manner as in Reference Example 1 except that a platinum target was used in place of the gold target and ZSM-5 zeolite carrier particles (Si/Al ratio: 40) were used as the zeolite carrier particle. The amount of platinum supported was 0.59 mass % relative to the zeolite carrier particle.

Reference Example 22

In Reference Example 22, rhodium clusters were supported on a zeolite carrier particle by a method of laser ablation in liquid in the same manner as in Reference Example 1 except that a rhodium target was used in place of the gold target and ZSM-5 zeolite carrier particles (Si/Al ratio: 40) were used as the zeolite carrier particle. The amount of rhodium supported was 0.1 mass % relative to the zeolite carrier particle.

Reference Comparative Example 13

In Reference Comparative Example 13, a general three-way catalyst in which platinum, rhodium and palladium are supported on a mixed powder of alumina carrier particles and ceria-zirconia carrier particles was used. The amounts of platinum, rhodium and palladium supported were 0.2 mass %, 0.19 mass % and 0.25 mass %, respectively, relative to the carrier powder.

<Evaluation: Oxygen Oxidation Reaction Test of Adsorbed Carbon Monoxide>

The catalysts of Reference Examples 21 and 22 and Reference Comparative Example 13 were held at 800° C. for 1 hour in an atmosphere containing 500 ppm by volume of carbon monoxide and the balance helium to adsorb carbon monoxide to the supported catalyst, and then an oxygen oxidation reaction test of adsorbed carbon monoxide was performed by heating the supported catalyst having adsorbed thereto carbon monoxide at a temperature rise rate of 10° C./min to 800° C. in an atmosphere containing 10 vol % of oxygen and the balance helium. During these treatments, the spatial velocity was 10,000 $h^{-1}$.

In addition, the catalysts of Reference Examples 21 and 22 and Reference Comparative Example 13 were cleaned by performing the following treatments (i) to (iv):

(i) putting the catalyst at a concentration of 4 mass % in an aqueous 1 M sodium chloride solution, followed by stirring at 80° C. for 10 days, (ii) after (i) above, rinsing the catalyst with ion-exchanged water, (iii) after (ii) above, putting the catalyst at a concentration of 4 mass % in an aqueous solution containing 6 mass % of polyoxyethylene sorbitan monolaurate, 0.25 M trisodium ethylenediaminetetraacetate, and 0.01 M sodium borohydride, followed by stirring at 80° C. for 10 days, and (iv) after (iii) above, rinsing the catalyst with ion-exchanged water.

The catalysts of Reference Examples 21 and 22 and Reference Comparative Example 13 subjected to the cleaning treatment were subjected to the above-described oxygen oxidation reaction test of adsorbed carbon monoxide.

Figure 22:
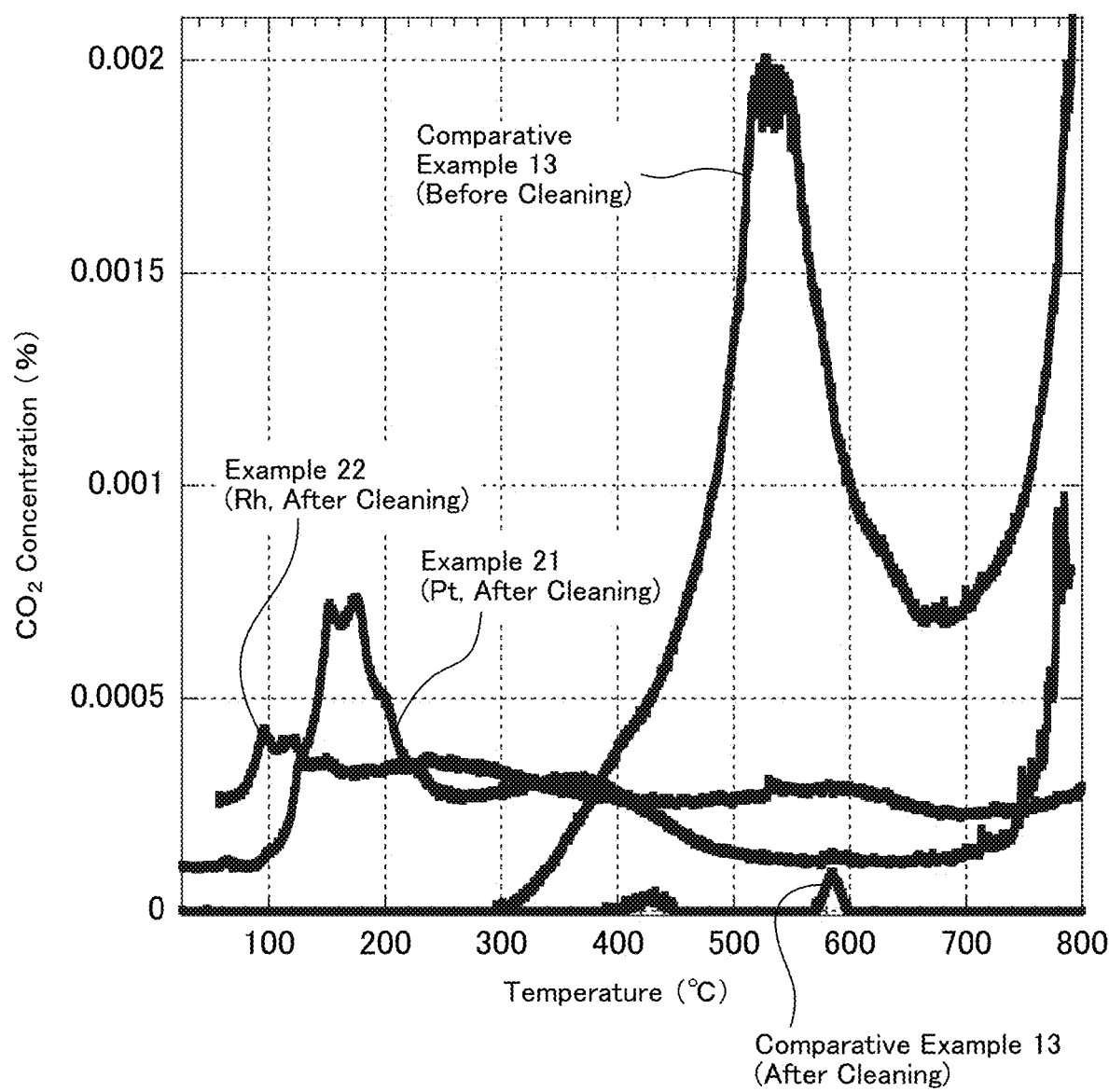
FIG. 22 is a graph illustrating the results of an oxygen oxidation reaction test of adsorbed carbon monoxide after cleaning treatment with respect to the platinum cluster-supporting catalyst of Reference Example 21 prepared by a method of laser ablation in liquid and the rhodium cluster-supporting catalysts of Reference Example 22 prepared by a method of laser ablation in liquid, and the results of an oxygen oxidation reaction test of adsorbed carbon monoxide before and after cleaning treatment with respect to a general three-way catalyst.

With respect to the catalysts of Reference Examples 21 and 22 and Reference Comparative Example 13, the results of the oxygen oxidation reaction test of adsorbed carbon monoxide before and after the cleaning treatment are illustrated in FIG. 22.

As apparent from FIG. 22, in the catalysts of Reference Examples 21 and 22 obtained by the method of laser ablation in liquid, a signal on the low temperature side of 200° C. or less was present before and after the cleaning treatment, whereas in the catalyst of Reference Comparative Example 13 that is a general three-way catalyst, the difference in the evaluation result between before and after the cleaning treatment was large and a signal on the low temperature side of 200° C. or less was not observed.

This is considered to be attributable to the fact that in the catalysts of Reference Examples 21 and 22 obtained by the method of laser ablation in liquid, the catalyst metal clusters was supported within the pores of zeolite and the catalyst metal clusters was thereby not lost even by cleaning, whereas in the general three-way catalyst, the catalyst metal particles were supported on the outer surface of the carrier particle and consequently, the catalyst metal particles were lost by cleaning.

DESCRIPTION OF NUMERICAL REFERENCES

11 Acetone as dispersion medium
12 Plate of gold
13 Vessel
14 Lens
15 Laser
16 Gold cluster
20 Zeolite carrier particle

The invention claimed is:

1. A cluster-supporting catalyst, comprising boron-substituted zeolite particles, and catalyst metal clusters supported within the pores of the boron-substituted zeolite particles.

2. The cluster-supporting catalyst according to claim 1, wherein the catalyst metal clusters have positive charge, and are supported on acid sites within the pores of the boron-substituted zeolite particles through an electrostatic interaction.

3. The cluster-supporting catalyst according to claim 1, wherein the catalyst metal clusters are selected from a group consisting of rhodium clusters, palladium clusters, platinum clusters and copper clusters, and combinations thereof.

4. A catalyst device, comprising the catalyst according to claim 1 and a substrate supporting the catalyst.

5. A method for producing a cluster-supporting catalyst according to claim 1,
which comprises the followings steps:
providing a dispersion liquid containing a dispersion medium and the boron-substituted zeolite particles dispersed in the dispersion medium, and
forming, in the dispersion liquid, catalyst metal clusters having a positive charge, and supporting the catalyst metal clusters on acid sites within the pores of the boron-substituted zeolite particles through an electrostatic interaction.

6. The method according to claim 5, wherein the dispersion liquid is provided by pulverizing the boron-substituted zeolite particles, and dispersing the pulverized boron-substituted zeolite particles in the dispersion medium.

7. The method according to claim 5, wherein the clusters are formed in the dispersion liquid by any of the following methods:
a method of laser ablation in liquid,
a method of microwave ablation in liquid,
a method of plasma ablation in liquid, and
a positive-negative inversion method.

8. The method according to claim 5, wherein the clusters are formed in the dispersion liquid by a method of reduction in liquid.

9. The method according to claim 8, wherein the dispersion liquid is irradiated with plasma and/or microwave to promote reduction of an ion of the catalyst metal by the reducing agent.

10. The method according to claim 5, wherein the dispersion medium of the dispersion liquid is an organic solvent.

* * * * *